United States Patent
Ohisa et al.

(10) Patent No.: US 10,024,257 B2
(45) Date of Patent: Jul. 17, 2018

(54) ENGINE CONTROL DEVICE

(71) Applicant: MAZDA MOTOR CORPORATION, Hiroshima (JP)

(72) Inventors: Chikako Ohisa, Hiroshima (JP); Osamu Sunahara, Hiroshima (JP); Daisuke Umetsu, Hiroshima (JP); Takuo Hirano, Higashihiroshima (JP); Kunihiro Shishima, Hiroshima (JP); Takahiro Kawamura, Hiroshima (JP); Yasunori Takahara, Hiroshima (JP); Daisaku Ogawa, Hiroshima (JP); Takeatsu Ito, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 9 days.

(21) Appl. No.: 15/446,420

(22) Filed: Mar. 1, 2017

(65) Prior Publication Data

US 2017/0254278 A1 Sep. 7, 2017

(30) Foreign Application Priority Data

Mar. 3, 2016 (JP) .................................. 2016-041075

(51) Int. Cl.
  *F02D 41/00* (2006.01)
  *F02D 11/02* (2006.01)
  (Continued)

(52) U.S. Cl.
  CPC .......... *F02D 41/0087* (2013.01); *F02D 11/02* (2013.01); *F02D 11/105* (2013.01);
  (Continued)

(58) Field of Classification Search
  CPC ...... F02D 41/0087; F02D 17/02; F02D 13/06; F02D 2041/0012; F02D 17/04;
  (Continued)

(56) References Cited

U.S. PATENT DOCUMENTS

2012/0209489 A1 8/2012 Saito et al.
2015/0053174 A1* 2/2015 Nishimoto .......... F02D 13/0207
                                                                    123/346
(Continued)

FOREIGN PATENT DOCUMENTS

JP  H07-145745 A   6/1995
JP  H08-310276 A   11/1996
(Continued)

OTHER PUBLICATIONS

An Office Action issued by the Japanese Patent Office dated Jul. 31, 2017, which corresponds to Japanese Patent Application No. 2016-041075 and is related to U.S. Appl. No. 15/446,420; with English language Concise Explanation.

*Primary Examiner* — Sizo Vilakazi
(74) *Attorney, Agent, or Firm* — Studebaker & Brackett PC

(57) ABSTRACT

A PCM comprises a basic target torque-deciding part for deciding a basic target torque, based on a driving state of a vehicle including an accelerator pedal operation state, a torque reduction amount-deciding part for deciding a torque reduction amount, based on a driving state of the vehicle other than the accelerator pedal operation state, a final target torque-deciding part for deciding a final target torque, based on the decided basic target torque and the decided torque reduction amount, and an engine output control part for controlling an engine to cause the engine to output the decided final target torque, wherein the engine output control part is operable to prohibit switching of an operation mode of the engine from being performed simultaneously with control of the engine according to a change in the final target torque corresponding to a change in the torque reduction amount.

9 Claims, 10 Drawing Sheets

(51) Int. Cl.
*F02D 41/02* (2006.01)
*F02P 5/04* (2006.01)
*F02D 11/10* (2006.01)
*F02D 37/02* (2006.01)
*F02P 5/15* (2006.01)

(52) U.S. Cl.
CPC ......... *F02D 37/02* (2013.01); *F02D 41/0002* (2013.01); *F02D 41/021* (2013.01); *F02P 5/045* (2013.01); *F02D 2041/002* (2013.01); *F02P 5/1504* (2013.01)

(58) Field of Classification Search
CPC ........ F02D 17/00; F02D 17/026; F02D 11/02; F02D 41/021; F02D 11/105; F02D 37/02; F02D 41/0002; F02P 5/045
USPC ...................................................... 123/198 F
See application file for complete search history.

(56) References Cited

U.S. PATENT DOCUMENTS

| | | | |
|---|---|---|---|
| 2016/0215705 A1* | 7/2016 | Haizaki | F02D 13/0215 |
| 2016/0237920 A1* | 8/2016 | Higashio | F02P 5/045 |
| 2017/0167461 A1* | 6/2017 | Kanno | F02N 11/0814 |
| 2017/0175659 A1* | 6/2017 | Sunahara | F02D 41/0087 |

FOREIGN PATENT DOCUMENTS

| | | |
|---|---|---|
| JP | 2011-012610 A | 1/2011 |
| JP | 2011-088576 A | 5/2011 |
| JP | 2014-166014 A | 9/2014 |
| JP | 2015-231840 A | 12/2015 |

* cited by examiner

ENGINE CONTROL DEVICE

TECHNICAL FIELD

The present invention relates to an engine control device, and more particularly to an engine control device for controlling an internal combustion engine having a plurality of cylinders and comprising an air amount adjustment device for adjusting an amount of intake air to be delivered to each of the cylinders, according to a target torque, and an ignition timing adjustment device for adjusting an ignition timing of an ignition device provided in each of the cylinders, based on a driving state of a vehicle equipped with the engine, wherein the engine is capable of switching an operation mode thereof between an all-cylinder operation in which combustion of an air-fuel mixture is performed in all of the plurality of cylinders and a reduced-cylinder operation in which combustion of an air-fuel mixture is stopped in a part of the plurality of cylinders.

BACKGROUND ART

Heretofore, there has been known a control device capable of, in a situation where a behavior of a vehicle becomes unstable due to road wheel slip or the like, controlling the vehicle behavior to enable a safe traveling (e.g., an antiskid brake device). Specifically, there has been known a control device operable to detect the occurrence of vehicle understeer or oversteer behavior during vehicle cornering or the like, and apply an appropriate degree of deceleration to one or more road wheels so as to suppress such a behavior.

There has also been known a vehicle motion control device operable to adjust a degree of deceleration during vehicle cornering to thereby adjust load to be applied to front road wheels as steerable road wheels so as to allow a series of driver's operations (braking, turning of a steering wheel, accelerating, turning-back of the steering wheel, etc.) during vehicle cornering under a normal traveling condition to be realized naturally and stably, differently from the aforementioned control for improving safety in a traveling condition causing the vehicle behavior to become unstable (see, for example, the following Patent Document 1).

Further, there has been proposed a vehicle behavior control device operable to reduce a driving force for a vehicle according to yaw rate-related quantity corresponding to a steering wheel operation by a driver (e.g., yaw acceleration), thereby making it possible to quickly generate vehicle deceleration in response to start of the steering wheel operation by the driver and thus quickly apply a sufficient load to front road wheels as steerable road wheels (see, for example, the following Patent Document 2). In this vehicle behavior control device, in response to start of the steering wheel operation, load is quickly applied to the front road wheels to cause an increase in frictional force between each of the front road wheels and a road surface and thus an increase in cornering force of the front road wheels, thereby providing an improved turn-in ability of the vehicle in an initial phase after entering a curve, and an improved responsivity with respect to a turning operation of a steering wheel. This makes it possible to realize a vehicle behavior as intended by the driver.

CITATION LIST

Patent Document

Patent Document 1: JP 2011-88576A
Patent Document 2: JP 2014-166014A

SUMMARY OF INVENTION

Technical Problem

Meanwhile, in the field of multi-cylinder internal combustion engines (i.e., internal combustion engines of a type having a plurality of cylinders), with a view to improving fuel economy, there has been known a technique of switching an operation mode of the engine between an all-cylinder operation in which combustion of an air-fuel mixture is performed in all of the plurality of cylinders and a reduced-cylinder operation in which combustion of an air-fuel mixture is stopped in a part of the plurality of cylinders (a part of the plurality of cylinders is deactivated), according to a driving state of a vehicle equipped with the engine.

When switching the operation mode from the all-cylinder operation to the reduced-cylinder operation, it is common to perform control of increasing an intake air amount to be delivered to a cylinder in which combustion is continued (non-deactivatable cylinder), so as to maintain an engine output before and after switching of the operation mode. However, a relatively large response lag occurs until an effect of control of a throttle valve and/or an intake variable valve timing mechanism corresponding to an increase in target air amount is reflected on an in-cylinder air amount. This can lead to a risk that the intake air amount is not sufficiently increased during the switching of the operation mode, and a torque shock occurs due to drop in engine output.

As a result of diligent researches, the inventors of the present invention have found that a sufficient intake air amount can be obtained during switching of the operation mode from the all-cylinder operation to the reduced-cylinder operation, by performing a preliminary control of, before the switching of the operation mode, preliminarily increasing the intake air amount to be delivered to a non-deactivatable cylinder and concurrently retarding an ignition timing of an ignition device in each cylinder so as to cancel out a rise in torque which would otherwise be caused by the increase in the intake air amount.

In the above multi-cylinder internal combustion engine, when the vehicle behavior control device described in the Patent Document 2 operates to instantaneously reduce an engine torque according a steering wheel operation by a driver, switching of the operation mode from the all-cylinder operation to the reduced-cylinder operation can occur. In this situation, retardation of ignition timing by the preliminary control prior to switching of the operation mode from the all-cylinder operation to the reduced-cylinder operation are likely to be performed simultaneously with retardation of ignition timing for torque reduction by the vehicle behavior control device, possibly leading to the occurrence of unintended misfire.

The present invention has been made to solve the above conventional problem, and an object thereof is to provide an engine control device capable of controlling a multi-cylinder internal combustion engine so as to accurately realize a vehicle behavior as intended by a driver, while satisfying both of switching of an operation mode of the engine from an all-cylinder operation to a reduced-cylinder operation and torque reduction based on a driving state of a vehicle other than an accelerator pedal operation state to thereby suppress the occurrence of misfire.

Solution to Technical Problem

In order to achieve the above object, the present invention provides an engine control device for controlling an internal combustion engine having a plurality of cylinders and comprising an air amount adjustment device for adjusting an amount of intake air to be delivered to each of the cylinders, according to a target torque, and an ignition timing adjustment device for adjusting an ignition timing of an ignition device provided in each of the cylinders, based on a driving state of a vehicle equipped with the engine, wherein the engine is capable of switching an operation mode thereof between an all-cylinder operation in which combustion of an air-fuel mixture is performed in all of the plurality of cylinders and a reduced-cylinder operation in which combustion of an air-fuel mixture is stopped in a part of the plurality of cylinders. The engine control device comprises: a basic target torque-deciding part for deciding a basic target torque, based on a driving state of the vehicle including an accelerator pedal operation state; a torque reduction amount-deciding part for deciding a torque reduction amount, based on a driving state of the vehicle other than the accelerator pedal operation state; a final target torque-deciding part for deciding a final target torque, based on the decided basic target torque and the decided torque reduction amount; and an engine output control part for switchably setting the operation mode of the engine to the reduced-cylinder operation when an operating state of the engine falls within a predefined reduced-cylinder operation region or to the all-cylinder operation when the operating state of the engine falls within a predefined all-cylinder operation region, and controlling the engine to cause the engine to output the decided final target torque in the set operation mode, wherein the engine output control part is operable, when a change in the final target torque corresponding to a change in the torque reduction amount causes a shift of the operating state of the engine from the all-cylinder operation region to the reduced-cylinder operation region, to prohibit switching of the operation mode of the engine from being performed simultaneously with control of the engine according to a change in the final target torque corresponding to a change in the torque reduction amount.

In the engine control device of the present invention having the above feature, the engine output control part operates to, when a change in the final target torque corresponding to a change in the torque reduction amount causes a shift of the operating state of the engine from the all-cylinder operation region to the reduced-cylinder operation region, prohibit the switching of the operation mode of the engine from being performed simultaneously with the control of the engine according to a change in the final target torque corresponding to a change in the torque reduction amount, so that it is possible to prevent retardation of ignition timing by the preliminary control prior to switching of the operation mode from the all-cylinder operation to the reduced-cylinder operation from being performed simultaneously with retardation of ignition timing for torque reduction based on the driving state of the vehicle other than the accelerator pedal operation state. This makes it possible to control the engine so as to accurately realize a vehicle behavior as intended by a driver, while satisfying both of the switching of the operation mode from the all-cylinder operation to the reduced-cylinder operation and the torque reduction based on the driving state of the vehicle other than the accelerator pedal operation state to thereby suppress the occurrence of misfire.

Preferably, in the engine control device of the present invention, the torque reduction amount-deciding part is operable to decide the torque reduction amount based on a steering wheel operation state of the vehicle.

In the engine control device having this feature, a temporal change in the torque reduction amount decided based on the steering operation state can be reflected on a temporal change in the final target torque. Thus, a deceleration according to a steering operation by a driver can be quickly added to the vehicle so as to apply load to front road wheels, so that it is possible to quickly increase a cornering force to thereby improve responsivity with respect to the steering wheel. This makes it possible to control the engine so as to accurately realize a vehicle behavior as intended by the driver.

Preferably, in the engine control device of the present invention, the engine output control part is operable, when a change in the final target torque corresponding to a change in the torque reduction amount causes a shift of the operating state of the engine from the all-cylinder operation region to the reduced-cylinder operation region, to maintain the operation mode of the engine in the all-cylinder operation.

In the engine control device having this feature, the engine output control part operates to, when there is a demand for torque reduction based on the driving state of the vehicle other than the accelerator pedal operation state, maintain the operation mode of the engine in the all-cylinder operation, so that it is possible to reliably prevent the switching of the operation mode of the engine from being performed simultaneously with the control of the engine according to a change in the final target torque corresponding to a change in the torque reduction amount, and prevent the retardation of ignition timing by the preliminary control prior to switching of the operation mode from the all-cylinder operation to the reduced-cylinder operation from being performed simultaneously with the retardation of ignition timing for torque reduction based on the driving state of the vehicle other than the accelerator pedal operation state. This makes it possible to control the engine so as to accurately realize a vehicle behavior as intended by a driver, while satisfying both of the switching of the operation mode from the all-cylinder operation to the reduced-cylinder operation and the torque reduction based on the driving state of the vehicle other than the accelerator pedal operation state to thereby suppress the occurrence of misfire.

Preferably, in the engine control device of the present invention, the engine output control part is operable, when a change in the final target torque corresponding to a change in the torque reduction amount causes a shift of the operating state of the engine from the all-cylinder operation region to the reduced-cylinder operation region, to restrict the control of the engine according to a change in the final target torque corresponding to a change in the torque reduction amount.

In the engine control device having this feature, the engine output control part operates to, when the operating state of the engine is shifted from the all-cylinder operation region to the reduced-cylinder operation region, restrict the control of the engine according to a demand for torque reduction based on the driving state of the vehicle other than the accelerator pedal operation state, so that it is possible to prevent a total of a retard amount of ignition timing for torque reduction based on the driving state of the vehicle other than the accelerator pedal operation state and a retard amount of ignition timing by the preliminary control prior to switching of the operation mode from the all-cylinder operation to the reduced-cylinder operation from becoming excessive. This makes it possible to control the engine so as to accurately realize a vehicle behavior as intended by a driver, while satisfying both of the switching of the operation mode from the all-cylinder operation to the reduced-cylinder operation and the torque reduction based on the driving state of the vehicle other than the accelerator pedal operation state to thereby suppress the occurrence of misfire.

More preferably, in the above engine control device, the engine output control part is operable, when a change in the final target torque corresponding to a change in the torque reduction amount causes a shift of the operating state of the engine from the all-cylinder operation region to the reduced-cylinder operation region, to prohibit the control of the engine according to a change in the final target torque corresponding to a change in the torque reduction amount.

In the engine control device having this feature, the engine output control part operates to, when the operating state of the engine is shifted from the all-cylinder operation region to the reduced-cylinder operation region, prohibit the control of the engine according to a demand for torque reduction based on the driving state of the vehicle other than the accelerator pedal operation state, so that it is possible to reliably prevent the retardation of ignition timing by the preliminary control prior to switching of the operation mode from the all-cylinder operation to the reduced-cylinder operation from being performed simultaneously with the retardation of ignition timing for torque reduction based on the driving state of the vehicle other than the accelerator pedal operation state. This makes it possible to control the engine so as to accurately realize a vehicle behavior as intended by a driver, while satisfying both of the switching of the operation mode from the all-cylinder operation to the reduced-cylinder operation and the torque reduction based on the driving state of the vehicle other than the accelerator pedal operation state to thereby suppress the occurrence of misfire.

Preferably, in the engine control device of the present invention, the engine output control part is operable, when the operating state of the engine is shifted from the all-cylinder operation region to the reduced-cylinder operation region, to perform a preliminary control of actuating the air amount adjustment device so as to increase an intake air amount to be delivered to each of the cylinders, and actuating the ignition timing adjustment device so as to retard the ignition timing of the ignition device, and, during the preliminary control, to restrict the control of the engine according to a change in the final target torque corresponding to a change in the torque reduction amount.

In the engine control device having this feature, the engine output control part operates to, during the preliminary control, restrict the control of the engine according to a change in the final target torque corresponding to a change in the torque reduction amount, so that it is possible to reliably prevent the retardation of ignition timing by the preliminary control prior to switching of the operation mode from the all-cylinder operation to the reduced-cylinder operation from being performed simultaneously with the retardation of ignition timing for torque reduction based on the driving state of the vehicle other than the accelerator pedal operation state.

Effect of Invention

The engine control device of the present invention can control the engine so as to accurately realize a vehicle behavior as intended by a driver, while satisfying both of switching of the operation mode from the all-cylinder operation to the reduced-cylinder operation and torque reduction based on the steering wheel operation to thereby suppress the occurrence of misfire.

BRIEF DESCRIPTION OF DRAWINGS

With reference to the accompanying drawings, a vehicle behavior control device according to one embodiment of the present invention will now be described.

Figure 1:
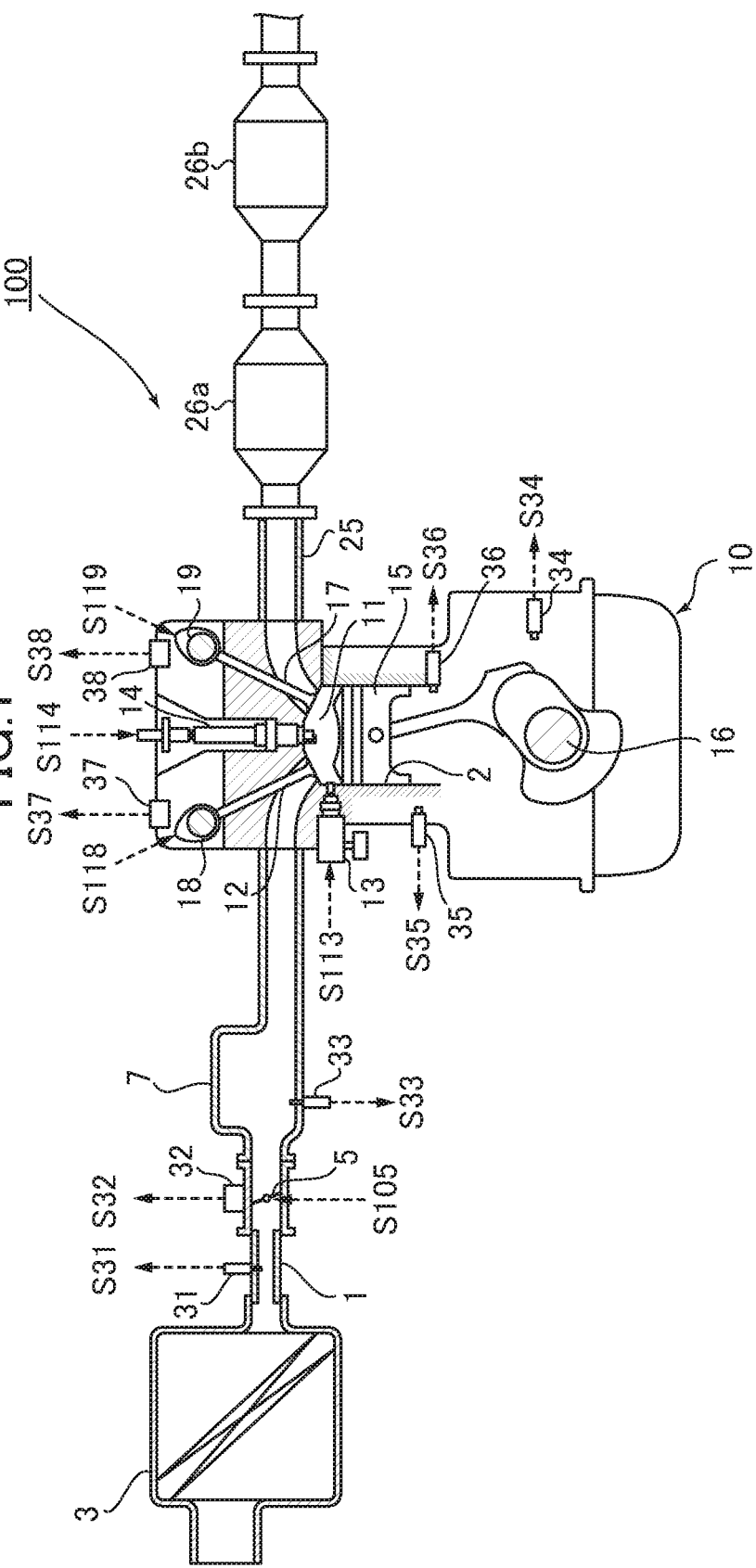
FIG. 1 is a schematic diagram depicting a configuration of an engine system employing an engine control device according to one embodiment of the present invention.
Figure 2:
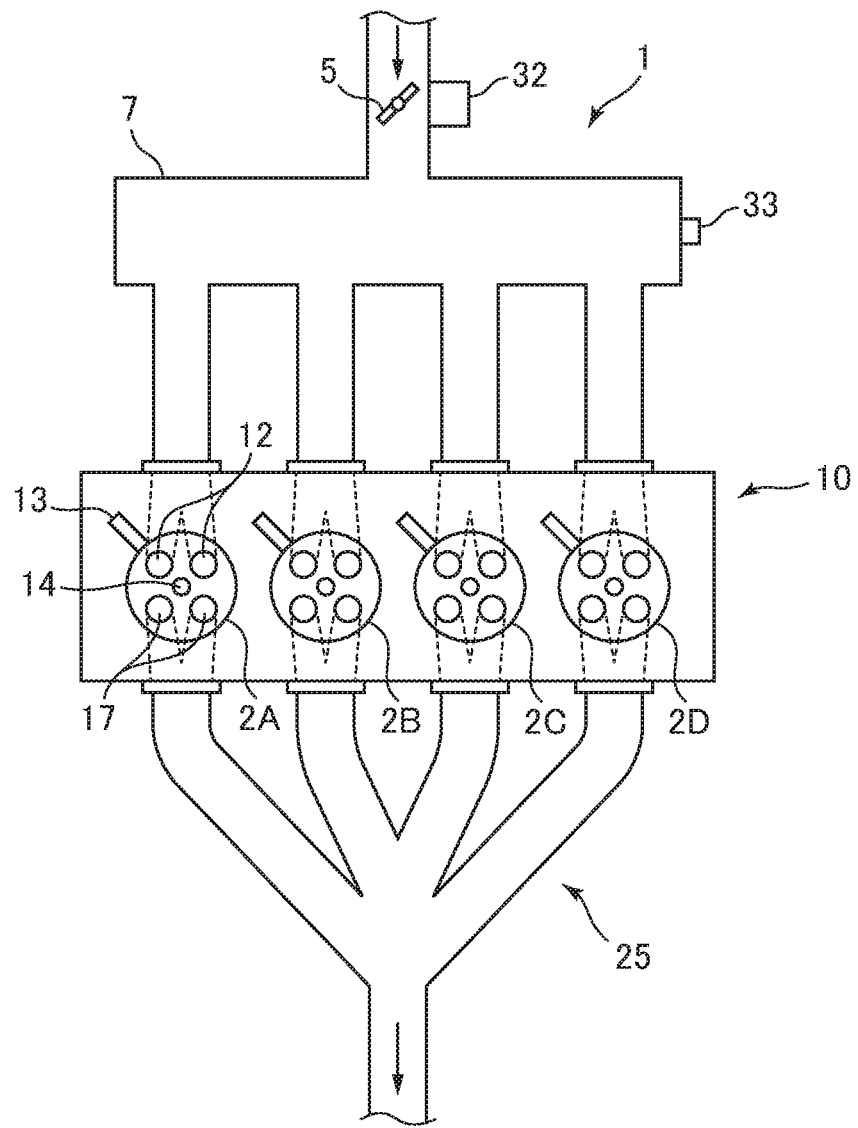
FIG. 2 is a schematic top plan view depicting the engine employing the engine control device according to this embodiment.

First of all, an engine system using an engine control device according to one embodiment of the present invention will be described with reference to FIGS. 1 to 3. FIG. 1 is a schematic diagram depicting a configuration of an engine system employing the engine control device according to this embodiment. FIG. 2 is a schematic top plan view of the engine in FIG. 1, and FIG. 3 is a block diagram depicting an electrical configuration of an engine system using the engine control device according to this embodiment.

Figure 3:
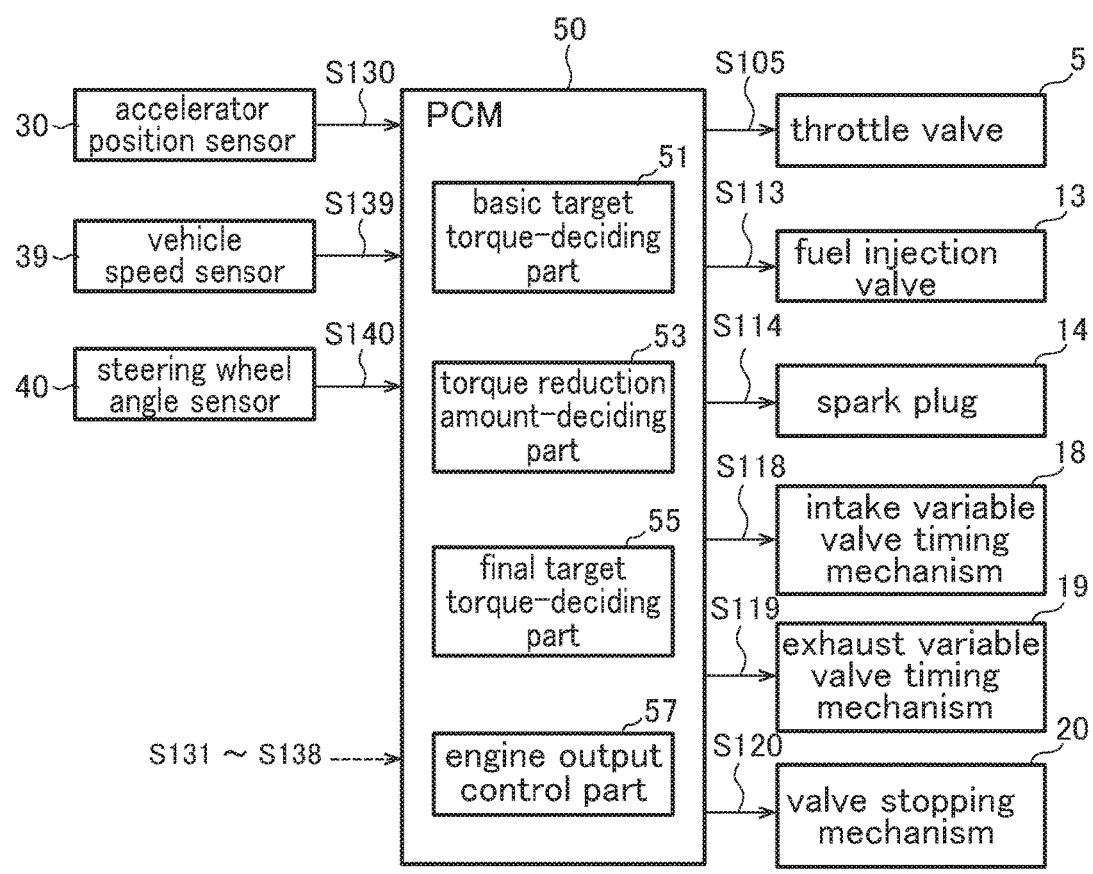
FIG. 3 is a block diagram depicting an electrical configuration of the engine control device according to this embodiment.

As depicted in FIGS. 1 to 3, the engine system 100 primarily comprises: an intake passage 1 for allowing intake air (air) introduced from outside to pass therethrough, an engine 10 (specifically, gasoline engine) for generating a vehicle driving force through combustion of a mixture of intake air supplied from the intake passage 1 and fuel supplied from an aftermentioned fuel injection valve 13, and an exhaust passage 25 for discharging exhaust gas produced by the combustion within the engine 10; a plurality of sensors 30 to 40 for detecting various states concerning the engine system 100; and a PCM 50 (engine control device) for controlling an entirety of the engine system 100.

The intake passage 1 is provided with an air cleaner 3 for cleaning intake air introduced from outside, a throttle valve 5 for adjusting an amount of intake air passing therethrough (intake air amount), and a surge tank 7 for temporarily reserving intake air to be delivered to the engine 10, which are arranged in this order from the side of an upstream end of the intake passage 1.

As depicted in FIG. 2, the engine 10 pertaining to this embodiment is an in-line four-cylinder gasoline engine comprising four cylinders 2A to 2D arranged side-by-side linearly. The engine 10 is primarily provided with: an intake valve 12 for selectively introducing intake air from the intake passage 1 into a combustion chamber 11; a fuel injection valve 13 for injecting fuel toward the combustion chamber 11; a spark plug 14 for igniting a mixture of the intake air and the fuel delivered and supplied into the combustion chamber 11; a piston 15 configured to be reciprocatingly moved according to combustion of the air-fuel mixture within the combustion chamber 11; a crankshaft 16 configured to be rotated according to the reciprocating movement of the piston 15; and an exhaust valve 17 for selectively discharging exhaust gas produced by the combustion of the air-fuel mixture within the combustion chamber 11, to the exhaust passage 25.

The piston 15 is provided in each of the cylinders 2A to 2D, wherein the engine 10 is configured such that the four pistons 15 are reciprocatingly moved with a phase difference of 180 degrees crank angle (180° CA). Correspondingly, ignition timings in the cylinders 2A to 2D are set such that they are sequentially shifted in phase by 180° CA.

The engine 10 pertaining to this embodiment is a cylinder deactivatable engine capable of performing an operation in which two of the four cylinders 2A to 2D are deactivated, and the remaining two cylinders are activated, i.e., a reduced-cylinder operation.

Specifically, assuming that the cylinder 2A, the cylinder 2B, the cylinder 2C and the cylinder 2D arranged in this order rightwardly in FIG. 2 are defined, respectively, as a first cylinder, a second cylinder, a third cylinder and a fourth cylinder, during an all-cylinder operation in which all of the four cylinders 2A to 2D are activated, ignition (firing) is performed in the following order: the first cylinder 2A→the third cylinder 2C→the fourth cylinder 2D→the second cylinder 2B.

On the other hand, during the reduced-cylinder operation, an ignition operation of the spark plugs 14 is prohibited in two of the cylinders which are mutually non-consecutive in terms of a firing order (combustion sequence) (in the engine 10 pertaining to this embodiment, the first cylinder 2A and the fourth cylinder 2D), and alternately performed in the remaining two cylinders (i.e., the third cylinder 2C and the second cylinder 2B).

The engine 10 is configured such that operation timings (which are equivalent to valve phases) of the intake valve 12 and the exhaust valve 17 are variably controlled, respectively, by an intake variable valve timing mechanism 18 and an exhaust variable valve timing mechanism 19 which serve as a variable valve timing mechanism. As each of the intake variable valve timing mechanism 18 and the exhaust variable valve timing mechanism 19, one of various heretofore-known types may be applied. For example, a variable valve timing mechanism of an electromagnetic type or a hydraulic type may be employed to variably control the operation timings of the intake valve 12 and the exhaust valve 17.

The engine 10 further comprises a valve stopping mechanism 20 for stopping opening and closing operations of the intake valves 12 and the exhaust valves 17 in the first and fourth cylinders 2A, 2D, during the reduced-cylinder operation. For example, the valve stopping mechanism 20 is constructed such that it comprises a so-called lost motion mechanism interposed between a cam and a valve and operable to selectively enable and disable a driving force of the cam to be transmitted to the valve. Alternatively, the valve stopping mechanism 20 is constructed such that it comprises a so-called cam shifting mechanism operable to selectively transmit one of operating states of two first and second cams having different cam profiles, wherein the first cam has a cam profile capable of enabling opening and closing operation of a valve, and the second cam has a cam profile capable of stopping the opening and closing operation of the valve.

The exhaust passage 25 is provided with a plurality of exhaust gas purifying catalysts 26a, 26b having exhaust gas purifying functions, such as a NOx catalyst, a three-way catalyst and an oxidation catalyst. In the following description, when the exhaust gas purifying catalysts 26a, 26b are generically used without being functionally distinguished from each other, they will be described as "exhaust gas purifying catalyst 26".

As mentioned above, the engine system 100 comprises a plurality of sensors 30 to 40 for detecting various states concerning the engine system 100. Specifically, these sensors 30 to 40 are as follows. The sensor 30 is an accelerator position sensor for detecting an accelerator position, i.e., an angular position of a non-depicted accelerator pedal (which is equivalent to an amount of depression of the accelerator pedal manipulated by a driver). The sensor 31 is an airflow sensor for detecting an intake air amount which is equivalent to a flow rate of intake air passing through the intake passage 1. The sensor 32 is a throttle opening sensor for detecting a throttle opening which is an opening degree of the throttle valve 5. The sensor 33 is a pressure sensor for detecting an intake manifold pressure (internal pressure of an intake manifold) which is equivalent to a pressure of intake air supplied to the engine 10. The sensor 34 is a crank angle sensor for detecting a crank angle of the crankshaft 16. The sensor 35 is a water temperature sensor for detecting a water temperature which is a temperature of cooling water for cooling the engine 10. The sensor 36 is an in-cylinder temperature sensor for detecting an in-cylinder temperature which is an internal temperature of each cylinder 2 of the engine 10. The sensors 37 and 38 are, respectively, an intake-side cam angle sensor for detecting operation timings of the intake valve 12 including a valve-close timing, and an exhaust-side cam angle sensor for detecting operation timings of the exhaust valve 17 including a valve-close timing. The sensor 39 is a vehicle speed sensor for detecting a speed of a vehicle equipped with the engine 10 (vehicle speed). The sensor 40 is a steering wheel angle sensor for detecting a rotational angle (steering wheel angle) of a steering wheel (not depicted). The above sensors 30 to 40 are operable to output, to the PCM 50, detection signals S130 to S140 corresponding to detected parameters, respectively.

Based on the detection signals S130 to S140 input from the sensors 30 to 40, the PCM 50 is operable to perform controls for various components of the engine 10. Specifically, as depicted in FIG. 2, the PCM 50 is operable to: supply a control signal S105 to the throttle valve 5 to control of opening and closing timings and the throttle opening of the throttle valve 5; supply a control signal S113 to the fuel injection valve 13 to control a fuel injection amount and a fuel injection timing; supply a control signal S114 to the spark plug 14 to control an ignition timing; supply control signals S118, S119, respectively, to the intake variable valve timing mechanism 18 and the exhaust variable valve timing mechanism 19 to control the operation timings of the intake valve 12 and the exhaust valve 17; and supply a control signal S120 to the valve stopping mechanism 20 to control deactivation/activation of the opening and closing operations of the intake valves 12 and the exhaust valves 17 in the first and fourth cylinders 2A, 2D.

The PCM 50 comprises: a basic target torque-deciding part 51 for deciding a basic target torque based on a driving state of the vehicle including an accelerator pedal operation state; a torque reduction amount-deciding part 53 for deciding a torque reduction amount based on a driving state of the vehicle other than the accelerator pedal operation state; a final target torque-deciding part 55 for deciding a final target torque based on the decided basic target torque and the decided torque reduction amount; and an engine output control part 57 for controlling the engine 10 to cause the engine 10 to output the decided final target torque.

The above parts or elements of the PCM 50 are functionally realized by a computer which comprises: a CPU; various programs (including a basic control program such as an OS, and an application program capable of being activated on the OS to realize a specific function) to be interpreted and executed by the CPU; and an internal memory such as ROM or RAM storing therein the programs and a variety of data.

Next, with reference to FIGS. 4 to 9, an engine control processing routine to be executed by the engine control device according to this embodiment will be described.

Figure 4:
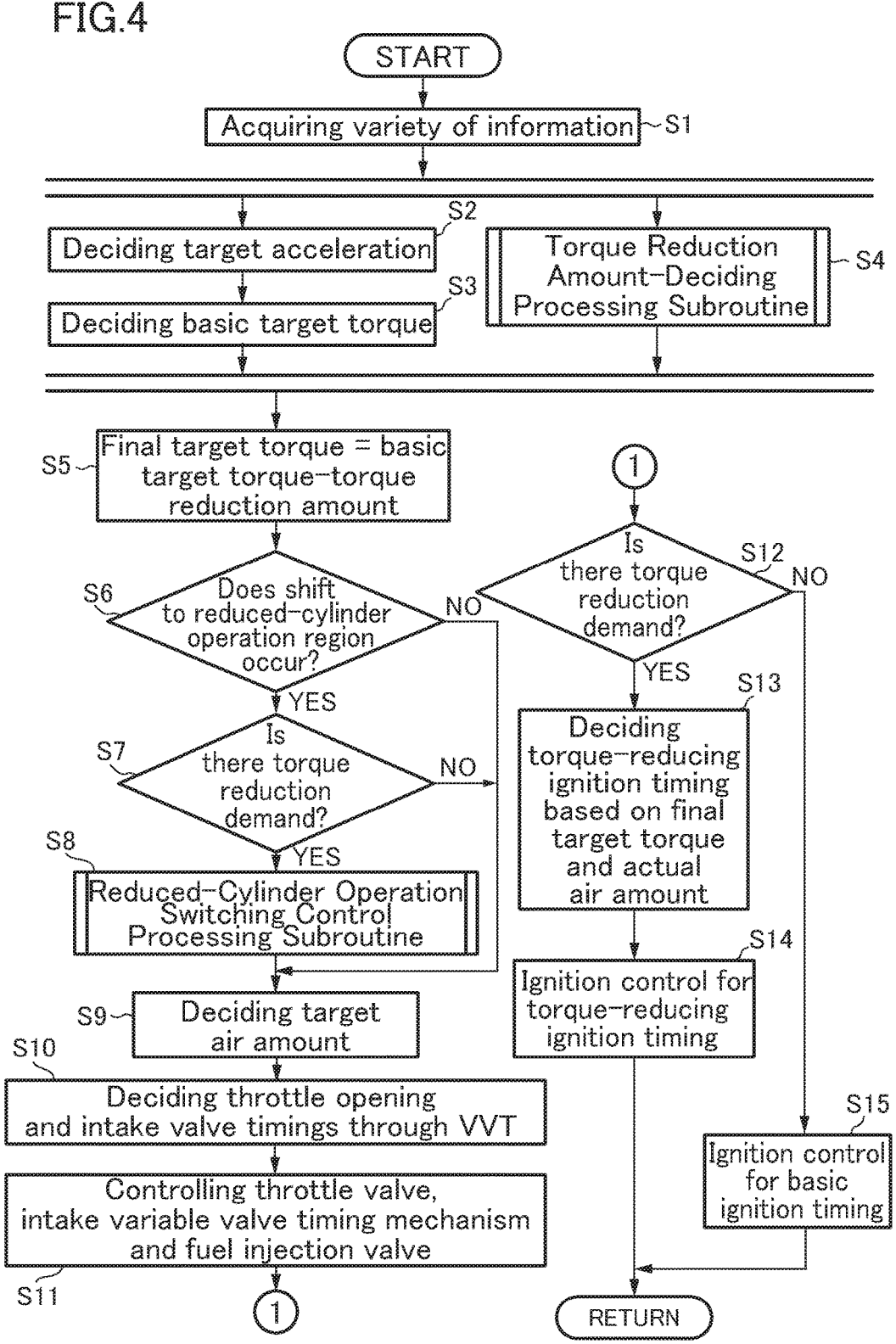
FIG. 4 is a flowchart of a first example of an engine control processing routine to be executed by the engine control device according to this embodiment, so as to control the engine.
Figure 5:
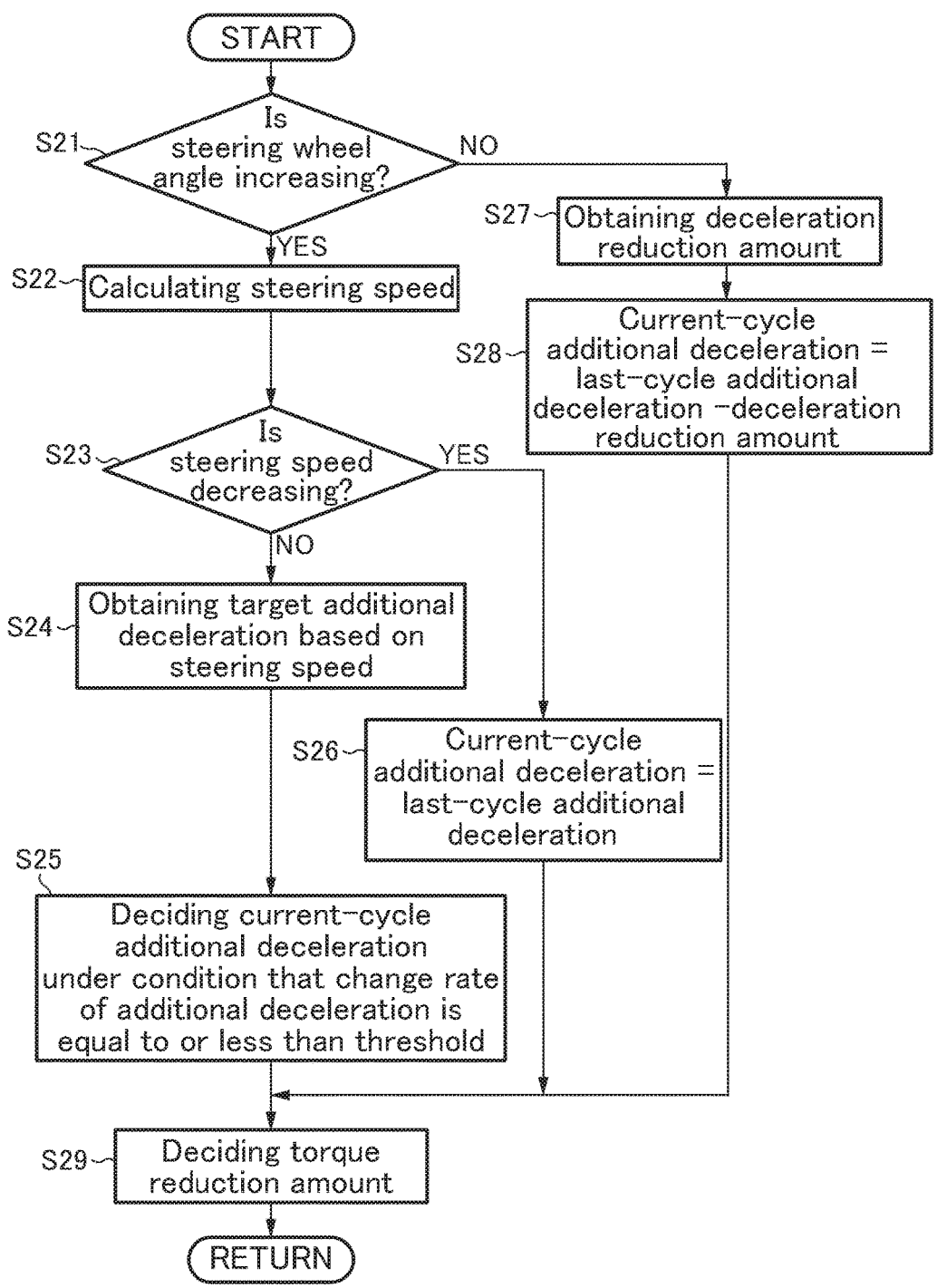
FIG. 5 is a flowchart of a torque reduction amount-deciding processing subroutine to be executed by the engine control device according to this embodiment, so as to decide a torque reduction amount.
Figure 6:
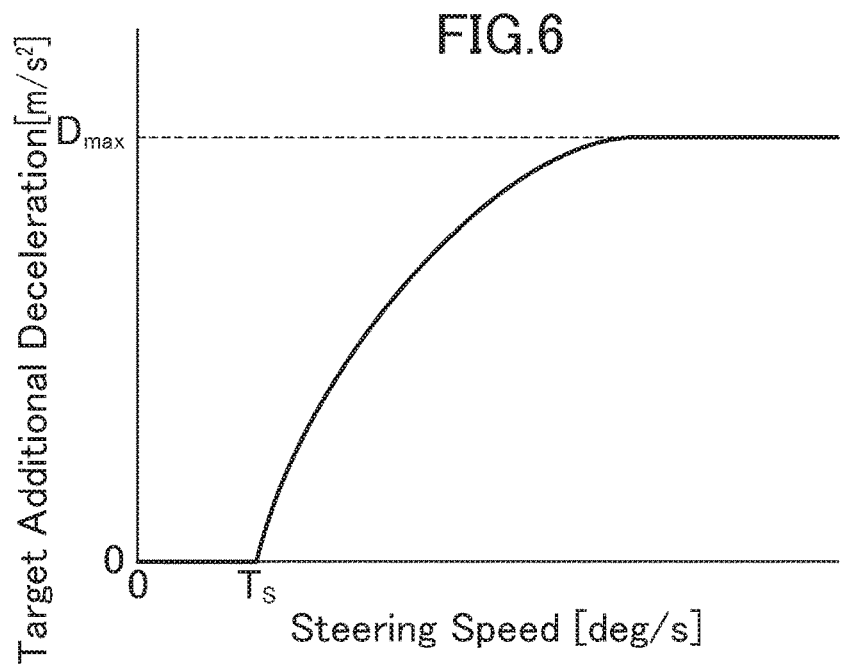
FIG. 6 is a map depicting a relationship between steering speed, and target additional deceleration to be decided by the engine control device according to this embodiment.
Figure 7:
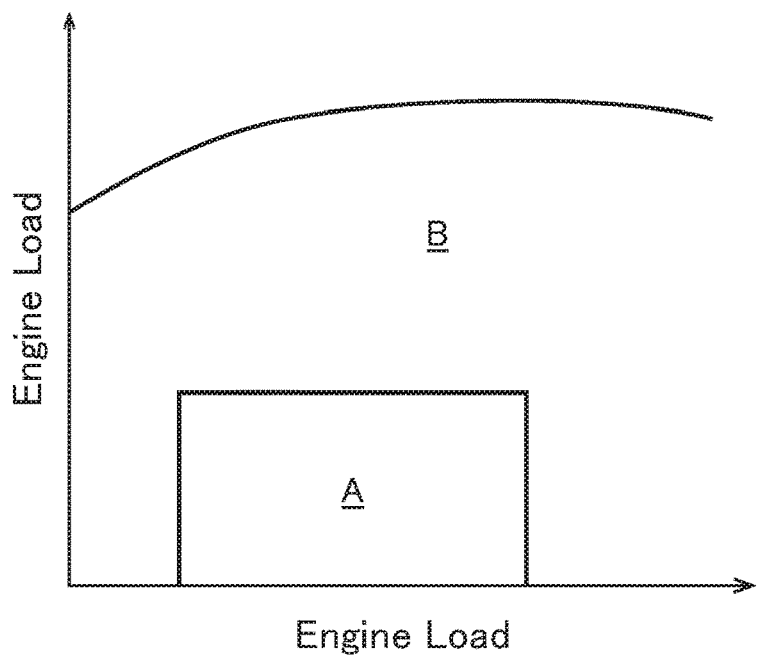
FIG. 7 is a map conceptually depicting engine operating regions for use in switching an operation mode of the engine by the engine control device according to this embodiment.
Figure 8:
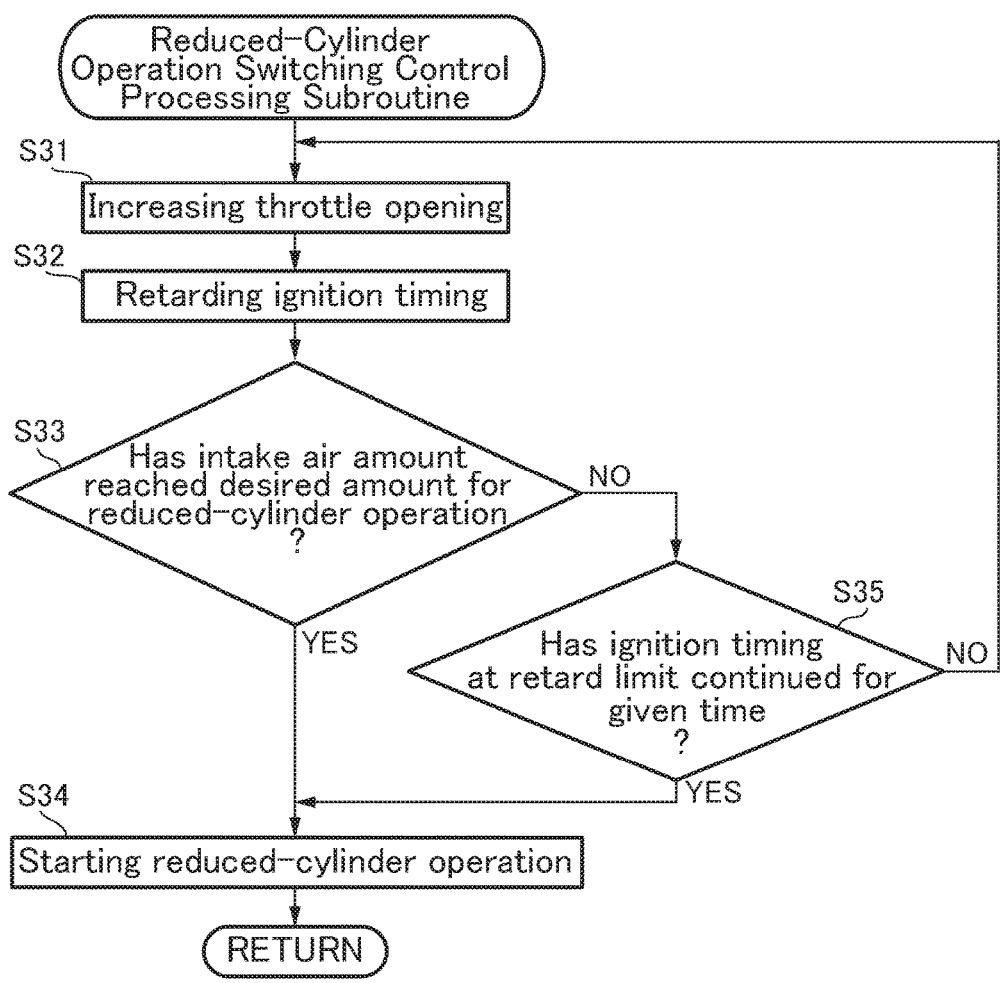
FIG. 8 is a flowchart of a reduced-cylinder operation switching control processing subroutine to be executed by the engine control device according to this embodiment, so as to switch the operation mode of the engine to a reduced-cylinder operation.
Figure 9:
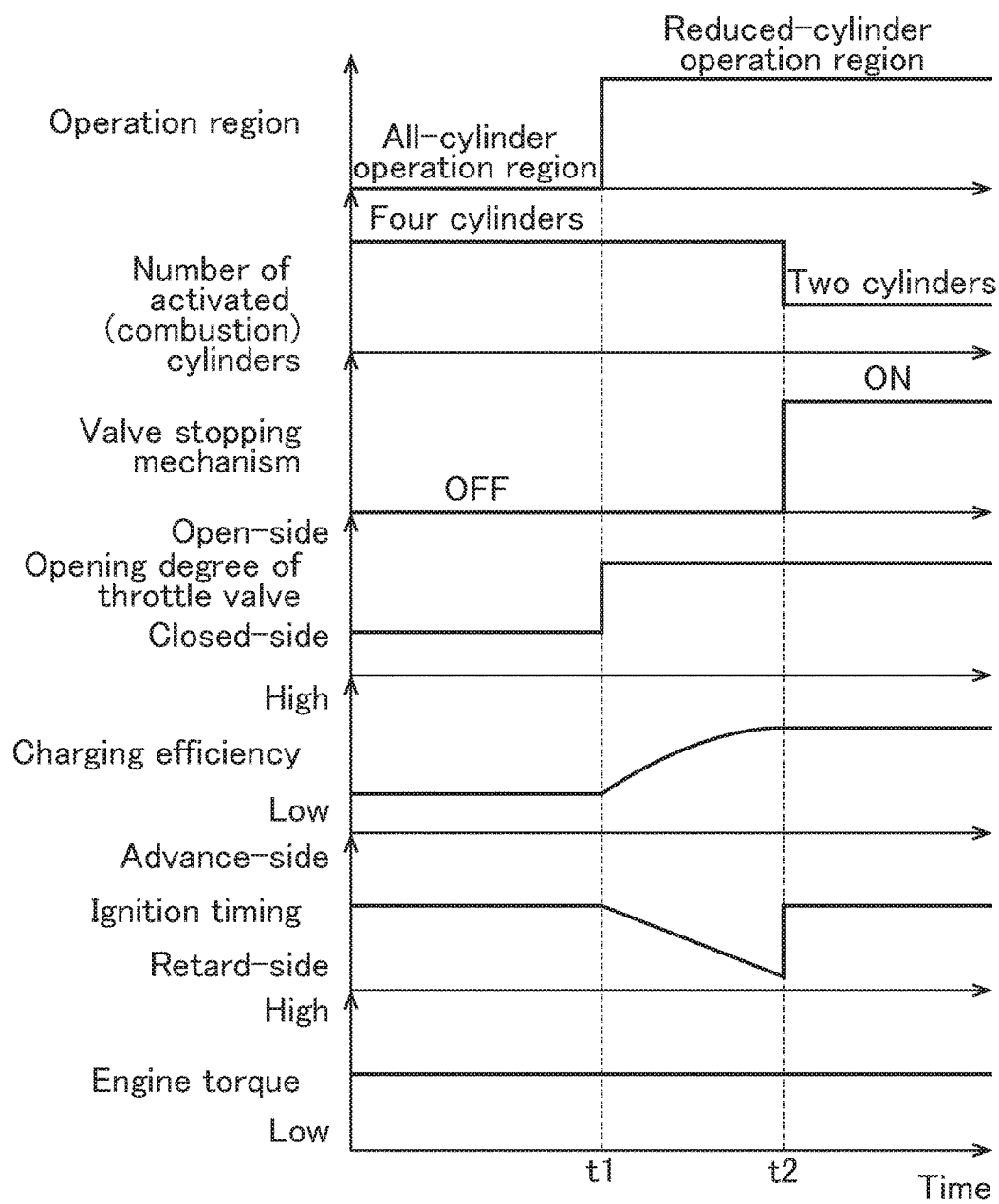
FIG. 9 is a time chart presenting a temporal change in each parameter pertaining to engine control to be performed by the engine control device according to this embodiment during switching the operation mode of the engine to the reduced-cylinder operation.

FIG. 4 is a flowchart of a first example of an engine control processing routine to be executed by the engine control device according to this embodiment, so as to control the engine, and FIG. 5 is a flowchart of a torque reduction amount-deciding processing subroutine to be executed by the engine control device according to this embodiment, so as to decide a torque reduction amount. FIG. 6 is a map depicting a relationship between steering speed, and target additional deceleration to be decided by the engine control device according to this embodiment, and FIG. 7 is a map conceptually depicting engine operating regions for use in switching an operation mode of the engine by the engine control device according to this embodiment. FIG. 8 is a flowchart of a reduced-cylinder operation switching control processing subroutine to be executed by the engine control device according to this embodiment, so as to switch the operation mode of the engine to a reduced-cylinder operation, and FIG. 9 is a time chart presenting a temporal change in each parameter pertaining to engine control to be performed by the engine control device according to this embodiment during switching the operation mode of the engine to the reduced-cylinder operation.

The engine control processing routine in FIG. 4 is activated when an ignition switch of the vehicle is turned on to apply power to the engine control device, and repeatedly executed with a given cycle period.

As depicted in FIG. 4, upon start of the engine control processing routine, in step S1, the PCM 50 operates to acquire information about a driving state of the vehicle. Specifically, the PCM 50 operates to acquire, as information about a driving state of the vehicle, detection signals S130 to S140 output from the aforementioned sensors 30 to 40, including an accelerator position detected by the accelerator position sensor 30, a vehicle speed detected by the vehicle speed sensor 39, a steering wheel angle detected by the steering wheel angle sensor 40, and a speed stage currently set in the automatic transmission of the vehicle.

Subsequently, in step S2, the basic target torque-deciding part 51 of the PCM 50 operates to set a target acceleration based on the driving state of the vehicle including an accelerator pedal operation state, acquired in the step S1. Specifically, the basic target torque-deciding part 51 operates to select, from among a plurality of acceleration characteristic maps each defining a relationship between acceleration and accelerator position, with respect to various vehicle speeds and various speed stages (the maps are preliminarily created and stored in a memory or the like), one acceleration characteristic map corresponding to a current vehicle speed and a current speed stage, and decide, as a target acceleration, an acceleration corresponding to a current accelerator position, with reference to the selected acceleration characteristic map.

Subsequently, in step S3, the basic target torque-deciding part 51 operates to decide a basic target torque of the engine 10 for realizing the target acceleration decided in the step S2. In this processing, the basic target torque-deciding part 51 operates to decide the basic target torque within a torque range outputtable by the engine 10, based on current vehicle speed, speed stage, road grade, road surface mu (µ) etc.

In parallel with the processings in the steps S2 and S3, in step S4, the torque reduction amount-deciding part 53 operates to perform a torque reduction amount-deciding processing subroutine for deciding a torque reduction amount based on a driving state of the vehicle other than the accelerator pedal operation state. This torque reduction amount-deciding processing subroutine will be described with reference to FIG. 5.

As depicted in FIG. 5, upon start of the torque reduction amount-deciding processing subroutine, in step S21, the torque reduction amount-deciding part 53 operates to determine whether or not an absolute value of the steering wheel angle acquired in the step S1 is increasing. As a result, when the absolute value of the steering wheel angle is increasing, the subroutine proceeds to step S22. In the step S22, the torque reduction amount-deciding part 53 operates to calculate a steering speed based on the steering wheel angle acquired in the step S1.

Subsequently, in step S23, the torque reduction amount-deciding part 53 operates to determine whether or not an absolute value of the steering speed is decreasing.

As a result, when the absolute value of the steering speed is not decreasing, i.e., the absolute value of the steering speed is increasing or the absolute value of the steering speed does not change, the subroutine proceeds to step S24. In the step S24, the torque reduction amount-deciding part 53 operates to obtain a target additional deceleration based on the calculated steering speed. This target additional deceleration is a deceleration to be added to the vehicle according to the steering wheel operation state in order to accurately realize a vehicle behavior which is intended by a driver.

Specifically, the torque reduction amount-deciding part 53 operates to obtain a value of the target additional deceleration corresponding to the steering speed calculated in the step S22, based on a relationship between target additional deceleration and steering speed, shown by the map in FIG. 6.

In FIG. 6, the horizontal axis represents the steering speed, and the vertical axis represents the target additional deceleration. As depicted in FIG. 6, when the steering speed is less than a threshold $T_s$ (e.g., 10 deg/s), a corresponding value of the target additional deceleration is 0. That is, when the steering speed is less than the threshold $T_s$, the control of adding deceleration to the vehicle according to the steering wheel operation state is not performed.

On the other hand, when the steering speed is equal to or greater than the threshold $T_s$, a value of the target additional deceleration corresponding to this steering speed comes closer to a given upper limit value $D_{max}$ (e.g., 1 m/s$^2$) as the steering speed becomes larger. That is, as the steering speed becomes larger, the target additional deceleration becomes larger, and a rate of increase of the target additional deceleration becomes smaller.

Subsequently, in the step S25, the torque reduction amount-deciding part 53 operates to decide an additional deceleration in the current processing cycle (current-cycle additional deceleration), under a condition that an increase rate of the additional deceleration is equal to or less than a threshold $R_{max}$ (e.g., 0.5 m/s$^3$).

Specifically, the torque reduction amount-deciding part 53 operates to, when an increase rate from an additional deceleration decided in the last processing cycle (last-cycle additional deceleration) to the target additional deceleration decided in the step S24 in the current processing cycle is equal to or less than the threshold $R_{max}$, decide the target additional deceleration decided in the step S24, as the current-cycle additional deceleration.

On the other hand, the torque reduction amount-deciding part 53 operates to, when the increase rate from the last-cycle additional deceleration to the target additional deceleration decided in the step S24 in the current processing cycle is greater than the threshold $R_{max}$, decide, as the current-cycle additional deceleration, a value obtained by increasing the last-cycle additional deceleration at the increase rate $R_{max}$ for the given cycle period.

Referring to the step S23 again, when the absolute value of the steering speed is decreasing, the subroutine proceeds to step S26. In the step S26, the torque reduction amount-deciding part 53 operates to decide the last-cycle additional deceleration as the current-cycle additional deceleration.

That is, when the absolute value of the steering speed is decreasing, an additional deceleration corresponding to a maximum value of the steering speed (i.e., a maximum value of the additional deceleration) is maintained.

Referring to the step S21 again, when the absolute value of the steering wheel angle is not increasing (i.e., is maintained constant or is decreasing), the subroutine proceeds to step S27. In the step S27, the torque reduction amount-deciding part 53 operates to obtain an amount (deceleration reduction amount) by which the last-cycle additional deceleration is to be reduced in the current processing cycle. For example, the deceleration reduction amount may be calculated based on a constant reduction rate (e.g., 0.3 m/s$^3$) preliminarily stored in a memory or the like. Alternatively, the deceleration reduction amount may be calculated based on a reduction rate decided according to the driving state of the vehicle acquired in the step S1 and/or the steering speed calculated in the step S22.

Subsequently, in step S28, the torque reduction amount-deciding part 53 operates to decide the current-cycle additional deceleration by subtracting the deceleration reduction amount obtained in the step S27 from the last-cycle additional deceleration.

After completion of the step S25, S26 or S28, in step S29, the torque reduction amount-deciding part 53 operates to decide the torque reduction amount, based on the current-cycle additional deceleration decided in the step S25, S26 or S28. Specifically, the torque reduction amount-deciding part 53 operates to decide a value of the torque reduction amount required for realizing the current-cycle additional deceleration, based on the current vehicle speed, speed stage, road gradient and others acquired in the step S1. After completion of the step S29, the torque reduction amount-deciding part 53 operates to terminate the torque reduction amount-deciding processing subroutine, and the subroutine returns to the main routine.

Returning to FIG. 4, after completion of the processings in the steps S2 and S3 and the torque reduction amount-deciding processing subroutine in the step S4, in step S5, the final target torque-deciding part 55 operates to subtract the torque reduction amount decided in the torque reduction amount-deciding processing subroutine in the step S4, from the basic target torque decided in the step S3 to thereby decide the final target torque.

Subsequently, in step S6, the engine output control part 57 operates to determine whether or not a change in the final target torque corresponding to a change in the torque reduction amount causes a shift of an operating state of the engine 10 from the all-cylinder operation to the reduced-cylinder operation, Specifically, the engine output control part 57 operates to determine whether or not an operating state of the engine 10 (which is defined, specifically, by the final target torque and the engine speed of the engine 10) in a last combustion cycle falls within an all-cylinder operation region, and an operating state of the engine 10 in a current combustion cycle falls within a reduced-cylinder operation region.

With reference to FIG. 7, a relationship between the operating state and the operation mode of the engine will be described here. In an operation mode map depicted in FIG. 7, the horizontal axis represents engine speed, and the vertical axis represents engine load (in this embodiment, the final target torque). As depicted in FIG. 7, the reduced-cylinder operation region A is set in a range having a relatively low engine speed and a relatively low engine load, and the all-cylinder operation region B is set in a range other than the reduced-cylinder operation region A.

More specifically, in the step S6, the engine output control part 57 operates to determine whether or not the operating state of the engine 10 in the current combustion cycle falls within the reduced-cylinder operation region in a low-speed and low-load range (the region A in FIG. 7). As a result, when the operating state of the engine 10 in the current combustion cycle falls within the reduced-cylinder operation region, the routine proceeds to step S7. In the step S7, the engine output control part 57 operates to determine whether or not there is a demand for torque reduction based on the driving state of the vehicle other than of the accelerator pedal operation. Specifically, when the torque reduction amount decided in the torque reduction amount-deciding processing subroutine in the step S4 is 0, the engine output control part 57 operates to determine that there is no demand for the torque reduction. On the other hand, when the decided torque reduction amount is greater than 0, the engine output control part 57 operates to determine that there is a demand for the torque reduction.

As a result, when there is no demand for the torque reduction, the routine proceeds to step S8. In the step S8, the engine output control part 57 operates to perform a reduced-cylinder operation switching control processing subroutine for switching the operation mode of the engine 10 to the reduced-cylinder operation.

This reduced-cylinder operation switching control processing subroutine will be described with reference to FIGS. 8 and 9.

As depicted in FIG. 8, upon start of the reduced-cylinder operation switching control processing subroutine, in step S31, the engine output control part 57 operates to increase the opening degree of the throttle valve 5.

Subsequently, in step S32, the engine output control part 57 operates to retard the ignition timing of the spark plug 14. Specifically, the ignition timing is retarded to a less-retarded one of an ignition timing retarded by an amount corresponding to an increase in intake air amount caused by increasing the opening degree of the throttle valve 5 in the step S31, and an ignition timing retarded by a predetermined retard limit.

Subsequently, in step S33, the engine output control part 57 operates to determine whether or not the intake air amount has reached a desired intake air amount for the reduced-cylinder operation. As a result, when the intake air amount has reached the desired intake air amount for the reduced-cylinder operation, the subroutine proceeds to step S34. In the step S34, the engine output control part 57 operates to start the reduced-cylinder operation.

Specifically, the engine output control part 57 operates to control the ignition plug 14 and the fuel injection valves 13 so as to deactivate ignition and fuel injection in two cylinders to be deactivated (the first cylinder 2A and the fourth cylinder 2D), and control the valve stopping mechanism 20 so as to maintain the intake valves 12 and the exhaust valves 17 in the two cylinders in a closed state. The engine output control part 57 also operates to terminate the ignition timing retard control for the activated cylinders (the second cylinder 2B and the third cylinder 2C).

On the other hand, when the intake air amount is determined, in the step S33, not to have reached the desired intake air amount for the reduced-cylinder operation, the subroutine proceeds to step S35. In the step S35, the engine output control part 57 operates to determine whether or not a retarded state of the ignition timing to the retard limit has continued for a given time. As a result, when the retarded state of the ignition timing to the retard limit has not yet continued for the given time, the subroutine returns to the step S31. Subsequently, until the intake air amount reaches the desired intake air amount for the reduced-cylinder operation in the step S33, or the retarded state of the ignition timing to the retard limit continues for the given time in the step S35, the processings in the steps S31 and S32 (preliminary control prior to start of the reduced-cylinder operation) will be repeated.

On the other hand, when the retarded state of the ignition timing to the retard limit has continued for the given time, the subroutine proceeds to the step S34. In the step S34, the engine output control part 57 operates to start the reduced-cylinder operation.

After completion of the step S34, the engine output control part 57 operates to terminate the reduced-cylinder operation switching control processing subroutine, and continue the main routine.

As presented in FIG. 9, in the reduced-cylinder operation switching control processing subroutine, when the operation region of the engine 10 is shifted from the all-cylinder operation region to the reduced-cylinder operation region at time t1, the engine output control part 57 operates to perform the preliminary control of increasing the opening degree of the throttle valve 5 to thereby increase the intake air amount (i.e., an intake air amount or charging efficiency per cylinder) to the desired intake air amount for the reduced-cylinder operation, and retarding the ignition timing so as to cancel out a rise in torque which would otherwise be caused by the increase in the intake air amount, without stopping combustion in the cylinders to be deactivated (the first cylinder 2A and the fourth cylinder 2D). This makes it possible to preliminarily increase the intake air amount so as to maintain a power output of the engine 10, and thus maintain the engine torque approximately constant during switching of the operation mode of the engine 10 from the all-cylinder operation to the reduced-cylinder operation, thereby avoiding the occurrence of a torque shock during the switching of the operation mode of the engine 10.

Returning to FIG. 4, after completion of the reduced-cylinder operation switching control processing subroutine in the step S8, the routine proceeds to step S9. In the step S9, the engine output control part 57 operates to decide a target air amount and a target fuel amount which are required for the engine 10 to output the final target torque decided in the step S5. As used herein, the term "air amount" means an amount of air to be introduced into the combustion chamber 11 of the engine 10. It is to be understood that non-dimensional charging efficiency may be used in place of the air amount.

Specifically, on the assumption that the engine 10 is operated in the reduced-cylinder operation mode, the engine output control part 57 operates to calculate a target indicated torque based on the final target torque and by additionally taking into consideration a loss torque due to friction loss and pumping loss, and calculate a target fuel amount required for the activated cylinders to generate the target indicated torque, and, based on the calculated target fuel amount and a target equivalent ratio, to decide a target air amount.

Referring to the step S6 again, when a change in the final target torque corresponding to a change in the torque reduction amount does not cause a shift of the operating state of the engine 10 from the all-cylinder operation region to the reduced-cylinder operation region, i.e., the operating state of the engine 10 in the current combustion cycle does not fall within the reduced-cylinder operation region, the engine output control part 57 operates to decide the target air amount and the target fuel amount in the step S9, without performing the reduced-cylinder operation switching control processing subroutine in the step S8. In this case, on the assumption that the engine 10 is operated in the all-cylinder operation mode, the engine output control part 57 operates to calculate the target indicated torque, and calculate a target fuel amount required for the all cylinders to generate the calculated target indicated torque, and, based on the calculated target fuel amount and a target equivalent ratio, to decide the target air amount.

Referring to the step S7 again, when there is a demand for torque reduction based on the driving state of the vehicle other than of the accelerator pedal operation, the engine output control part 57 operates to decide the target air amount and the target fuel amount in the step S9, without performing the reduced-cylinder operation switching control processing subroutine in the step S8. In this case, on the assumption that the engine 10 is operated in the all-cylinder operation mode, the engine output control part 57 operates to calculate the target indicated torque, and calculate the target fuel amount required for the all cylinders to generate the calculated target indicated torque, and, based on the calculated target fuel amount and a target equivalent ratio, to decide the target air amount.

That is, when there is a demand for the torque reduction, the engine output control part 57 operates to maintain the operation mode of the engine 10 in the all-cylinder operation, irrespective of the fact that the operating state of the engine 10 is shifted from the all-cylinder operation region to the reduced-cylinder operation region, thereby prohibiting the switching of the operation mode of the engine 10 from being performed simultaneously with the control of the engine 10 according to a change in the final target torque corresponding to a change in the torque reduction amount. More specifically, at least during execution of the processings in the steps S31 and S32 (preliminary control prior to start of the reduced-cylinder operation) in the reduced-cylinder operation switching control processing subroutine, the control of the engine 10 according to a change in the final target torque corresponding to a change in the torque reduction amount is restricted.

After deciding the target air amount and the target fuel amount in the step S9, the routine proceeds to step S10. In the step S10, the engine output control part 57 operates to decide an opening degree of the throttle valve 5, and opening and closing timings of the intake valve 12 through the intake variable valve timing mechanism 18, while taking into account the air amount detected by the airflow sensor 31, so as to enable air to be introduced into the engine 10 in an amount equal to the target air amount decided in the step S9.

Subsequently, in step S11, the engine output control part 57 operates to control the throttle valve 5 and the intake variable valve timing mechanism 18, based on the throttle opening and the opening and closing timings of the intake valve 12 set in the step S10, and control the fuel injection valve 13, based on the target fuel amount decided in the step S9.

Subsequently, in step S12, the engine output control part 57 operates to determine whether or not there is a demand for torque reduction based on the driving state of the vehicle other than the accelerator pedal operation. As a result, when there is a demand for the torque reduction, the routine proceeds to step S13. In the step S13, the engine output control part 57 operates to, based on the final target torque decided in the step S5 and an actual air amount actually introduced into the combustion chamber 11 by controlling the throttle valve 5 and the intake variable valve timing mechanism 18 in the step S11, decide a torque-reducing ignition timing for causing the engine 10 to output the decided final target torque.

Specifically, the engine output control part 57 operates to estimate an actual air amount, based on the detection signal S131 from the airflow sensor 31, etc. Then, the engine output control part 57 operates to select, from among a plurality of ignition advance maps each defining a relationship between ignition timing and indicated torque, with respect to various air amounts and various engine speeds (the maps are preliminarily created and stored in a memory or the like), one ignition advance map corresponding to the estimated actual air amount and a current engine speed, and decide, as the torque-reducing ignition timing, an ignition timing corresponding to the target indicated torque calculated in the step S9, with reference to the selected ignition advance map.

In the ignition advance map, on the assumption that the horizontal axis represents ignition timing, and the vertical axis represents indicated torque, the relationship between ignition timing and indicated torque is expressed as an upwardly convexed curve in which the indicated torque has a local maximum value when the ignition timing is at MBT (Minimum Advance for Best Torque), and gradually decreases as the ignition timing is advanced or retarded with respect to MBT.

In the case where, due to response lag of an actual air amount with respect to a reduction in the target air amount corresponding to a demand for the torque reduction, the actual air amount becomes excessive with respect to the reduced target air amount, an indicated torque at MBT in one ignition advance map corresponding to the actual air amount is greater than an indicated torque at MBT in another ignition advance map corresponding to the reduced target air amount. In other words, an ignition timing (i.e., torque-reducing ignition timing) corresponding to the target indicated torque in one ignition advance map corresponding to the actual air amount is retarded with respect to an ignition timing corresponding to the target indicated torque in another ignition advance map corresponding to the reduced target air amount. The torque-reducing ignition timing is gradually shifted toward a retard side as the actual air amount becomes more excessive with respect to the reduced target air amount.

Subsequently, in step S14, the engine output control part 57 operates to control the spark plug 14 so as to perform ignition at the torque-reducing ignition timing decided in the step S13. As above, when there is a demand for the torque reduction, it is possible to prohibit the switching of the operation mode of the engine 10 from being performed simultaneously with the control of the engine 10 according to a change in the final target torque corresponding to a change in the torque reduction amount. Thus, retardation of ignition timing by the preliminary control in the reduced-cylinder operation switching control processing subroutine is never performed simultaneously with retardation of ignition timing in the step S14.

Refereeing to the step S12 again, when there is no demand for the torque reduction, the routine proceeds to step S15. In the step S15, the engine output control part 57 operates to control the spark plug 14 so as to enable the spark plug 14 to perform ignition at an ignition timing (basic ignition timing) capable of providing best combustion efficiency with respect to an actual air amount actually introduced into the combustion chamber 11 by controlling the throttle valve 5 and the intake variable valve timing mechanism 18 in the step S11.

Specifically, the engine output control part 57 operates to set, as the basic ignition timing, a less-retarded one of an MBT in one ignition advance map corresponding to a current actual air amount and a current engine speed and a knock limit ignition timing corresponding to the current actual air amount and the current engine speed, and control the spark plug 14 so as to enable the spark plug 14 to perform ignition at the set ignition timing.

After completion of the step S14 or S15, the PCM 50 completes one cycle of the engine control processing routine.

Figure 10:
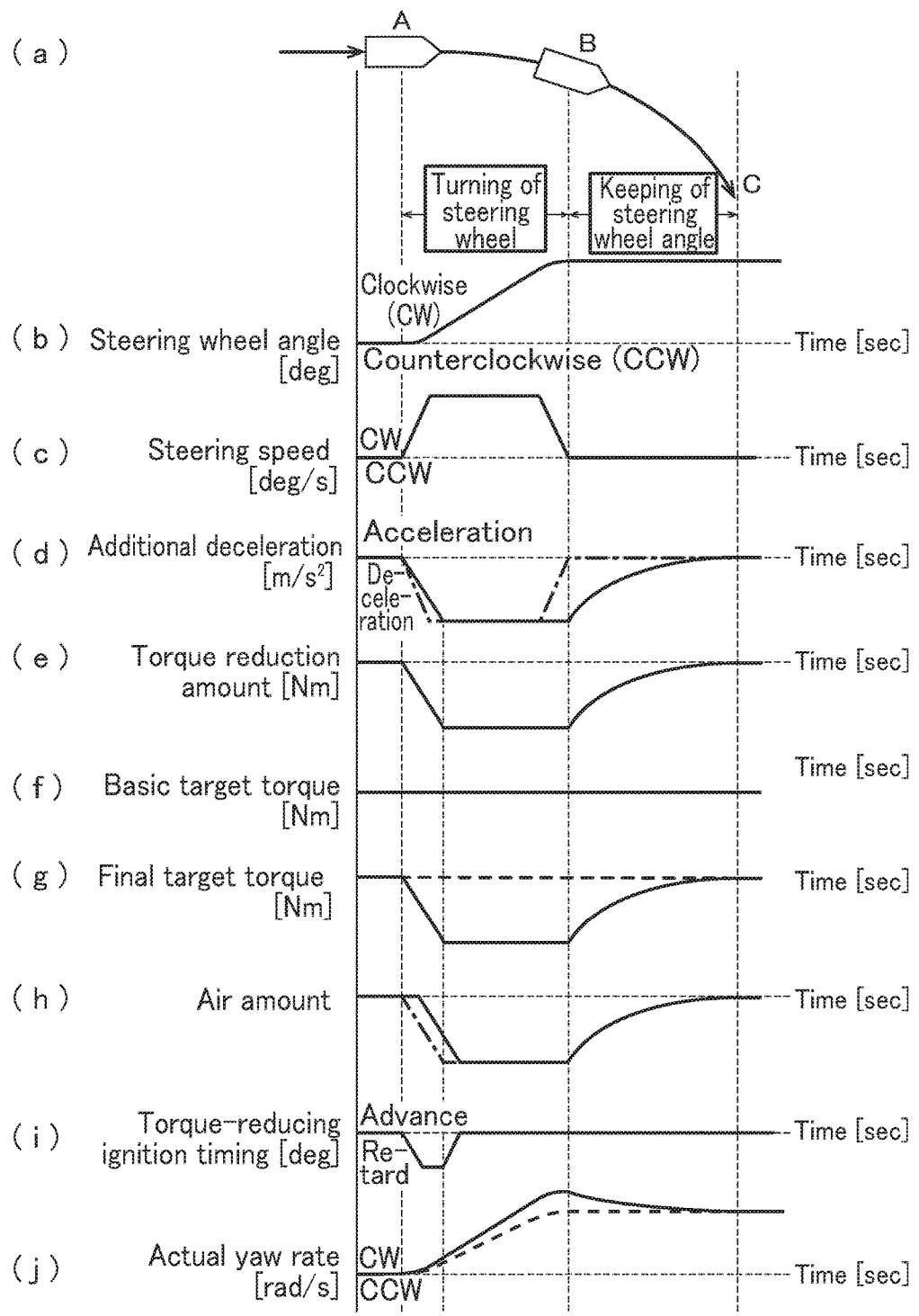
FIG. 10 is a time chart presenting a temporal change in each parameter pertaining to engine control to be performed by the engine control device according to this embodiment during turning of a vehicle equipped with the engine control device, wherein: chart (a) is a top plan view schematically depicting the vehicle which is turning in a clockwise direction; chart (b) presents a change in steering wheel angle of the vehicle which is turning in the clockwise direction as depicted in the chart (a); chart (c) presents a change in steering speed of the vehicle which is turning in the clockwise direction as depicted in the chart (a); chart (d) presents a change in additional deceleration decided based on the steering speed presented in the chart (c); chart (e) presents a change in torque reduction amount decided based on the additional deceleration presented in the chart (d); chart (f) presents a change in basic target torque; chart (g) presents a change in final target torque decided based on the basic target torque and the torque reduction amount; chart (h) presents a changes in target air amount decided based on the final target torque, and a change in actual air amount; chart (i) presents a torque-reducing ignition timing decided based on the final target torque and the actual air amount, on the basis of a basic ignition timing; and chart (j) presents a change in yaw rate (actual yaw rate) generated in the vehicle when an intake air amount and an ignition timing are controlled as presented in the charts (h) and (i), and a change in actual yaw rate generated in the vehicle when the engine control based on the torque reduction amount decided by a torque reduction amount-deciding part is not performed.

Next, with reference to FIG. 10, an operation of the engine control device according to this embodiment will be described. FIG. 10 is a time chart presenting a temporal change in each parameter pertaining to engine control to be performed by the engine control device according to this embodiment during turning of a vehicle equipped with the engine control device.

Chart (a) is a top plan view schematically depicting the vehicle which is turning in a clockwise direction. As depicted in chart (a), the vehicle starts to turn from a position A, and continues to turn from a position B to a position C in the clockwise direction at a constant steering wheel angle.

Chart (b) presents a change in steering wheel angle of the vehicle which is turning in the clockwise direction as depicted in the chart (a). In the chart (b), the horizontal axis represents time, and the vertical axis represents steering wheel angle.

As presented in the chart (b), clockwise steering is started at the position A, and then, along with an additional turning operation of the steering wheel, a clockwise steering wheel angle gradually increases and reaches a maximum value at the position B. Subsequently, the steering wheel angle is maintained constant until the vehicle reaches the position C (Keeping of the steering wheel angle).

Chart (c) presents a change in steering speed of the vehicle which is turning in the clockwise direction as depicted in the chart (a). In the chart (c), the horizontal axis represents time, and the vertical axis represents steering speed. That is, as presented in the chart (c), when clockwise steering is started at the position A, a clockwise steering speed arises and is maintained approximately constant in an intermediate zone between the position A and the position B. Then, when the clockwise steering speed deceases and the clockwise steering wheel angle reaches the maximum value at the position B, the steering speed becomes 0. Then, when the clockwise steering wheel angle is maintained during traveling from the position B to the position C, the steering speed is kept at 0.

Chart (d) presents a change in additional deceleration decided based on the steering speed presented in the chart (c). In the chart (d), the horizontal axis represents time, and the vertical axis represents additional deceleration. In the chart (d), the solid line indicates a change in the additional deceleration decided in the torque reduction amount-deciding processing subroutine in FIG. 5, and the one-dot chain line indicates a change in target additional deceleration based on steering speed. As with the change in steering speed presented in the chart (c), the target additional deceleration indicated by the one-dot chain line starts to increase from the position A, and is maintained approximately constant in an intermediate zone between the position A and the position B, whereafter it decreases, and becomes 0 at the position B.

As described with reference to FIG. 5, when the absolute value of the steering speed is determined in the step S23 to be not decreasing, i.e., to be increasing or to have no change, the torque reduction amount-deciding part 53 operates in the step S24 to obtain the target additional deceleration based on the steering speed. Subsequently, in the step S25, the torque reduction amount-deciding part 53 operates to decide an additional deceleration in each processing cycle, under the condition that the increase rate of additional deceleration is equal to or less than the threshold $R_{max}$.

The chart (d) presents a case where an increase rate of the target additional deceleration starting to increase from the position A is greater than the threshold $R_{max}$. In this case, the torque reduction amount-deciding part 53 operates to increase the additional deceleration at an increase rate equal to the upper limit $R_{max}$ (i.e., at an increase rate providing a gentler slope than that of the target additional deceleration indicated by the one-dot chain line). Then, when the target additional deceleration is maintained approximately constant in the intermediate zone between the position A and the position B, the torque reduction amount-deciding part 53 operates to decide that the additional deceleration is equal to the target additional deceleration.

Then, when the absolute value of the steering speed is determined in the step S23 depicted in FIG. 5 to be decreasing, the torque reduction amount-deciding part 53 operates to maintain the additional deceleration at the maximum steering speed, as mentioned above. Specifically, in the chart (d), when the steering speed decreases toward the position B, the target additional deceleration indicated by the one-dot chain line also decreases along therewith, but the additional deceleration indicated by the solid line is maintained at its maximum value, until the vehicle 1 reaches the position B.

On the other hand, when the absolute value of the steering angle is determined, in the step S21 depicted in FIG. 5, to be maintained constant or to be decreasing, the torque reduction amount-deciding part 53 operates to obtain the deceleration reduction amount in the step S27, and reduce the additional deceleration by the obtained deceleration reduction amount, as mentioned above. In the chart (d), the torque reduction amount-deciding part 53 operates to reduce the additional deceleration to cause a reduction rate of the additional deceleration to become gradually smaller, i.e., to cause a slope of the solid line indicative of a change in additional deceleration to become gradually gentler.

Chart (e) presents a change in torque reduction amount decided based on the additional deceleration presented in the chart (d). In the chart (e), the horizontal axis represents time, and the vertical axis represents torque reduction amount.

As mentioned above, the torque reduction amount-deciding part 53 operates to decide a value of the torque reduction amount required for realizing a current-cycle additional deceleration, based on parameters such as current vehicle speed, speed stage and road gradient. Thus, in the case where respective values of these parameters are constant, the torque reduction amount is decided such that it changes in the same pattern as that of the additional deceleration presented in the chart (d).

Chart (f) presents a change in basic target torque. In the chart (f), the horizontal axis represents time, and the vertical axis represents torque.

In one example shown in the chart (f), the basic target torque decided so as to realize the target acceleration set based on accelerator position, vehicle speed, speed stage and others is set to a constant value.

Chart (g) presents a change in final target torque decided based on the basic target torque and the torque reduction amount. In the chart (g), the horizontal axis represents time, and the vertical axis represents torque. In the chart (g), the dotted line indicates the basic target torque presented in the chart (f), and the solid line indicates the final target torque.

As described with reference to FIG. 4, the final target torque-deciding part 55 operates to subtract the torque reduction amount decided by the torque reduction amount-deciding processing subroutine in the step S4, from the basic target torque decided in the step S3, to thereby decide the final target torque. Thus, as indicated by the solid line in the chart (g), a change in the torque reduction amount is reflected on a change in the final target torque.

Chart (h) presents a change in target air amount decided based on the final target torque, and a change in actual air amount. In the chart (h), the horizontal axis represents time, and the vertical axis represents air amount. In the chart (h), the one-dot chain line indicates a target air amount corresponding to the final target torque presented in the chart (g), and the solid line indicates an actual air amount actually introduced into the combustion chamber 11 by controlling the throttle valve 5 and the intake variable valve timing mechanism 18.

As presented in the chart (h), when the target air amount changes in synchronization with a temporal change in the final target torque, response lag of the actual air amount occurs with respect to a change in the target air amount. That is, when the target air amount is decreasing, the actual air amount becomes excessive.

Chart (i) presents a torque-reducing ignition timing decides based on the final target torque and the actual air amount, on the basis of the basic ignition timing. In the chart (i), the horizontal axis represents time, and the vertical axis represents ignition timing (advance: positive side, retard: negative side), on the basis of the basic ignition timing.

As presented in the chart (h), when the target air amount is reduced according to a reduction in the final target torque, due to the occurrence of response lag of the actual air amount, the actual air amount becomes excessive with respect to the reduced target air amount. Thus, a desired reduction in the final target torque cannot be realized only by means of a reduction in the actual air amount. Therefore, based on the final target torque and the actual air amount, the torque-reducing ignition timing is set to a retard side with respect to the basic ignition timing to thereby realize the desired reduction in the final target torque.

Chart (j) presents a change in yaw rare (actual yaw rate) generated when control of the engine 10 is performed so as to realize the final target torque as presented in the chart (g), and a change in actual yaw rate generated when control corresponding to the torque reduction amount presented in the chart (e) is not performed (i.e., control of the engine 10 is performed so as to realize the basic target torque indicated by the dotted line in the chart (g)), under the condition the steering wheel in the vehicle is operated as presented in the chart (b). In the chart (j), the horizontal axis represents time and the vertical axis represents yaw rate. In the chart (j), the solid line indicates a change in actual yaw rate generated when the control of the engine 10 is performed so as to realize the final target torque, and the dotted line indicates a change in actual yaw rate generated when the control corresponding to the torque reduction amount is not performed.

After clockwise steering is started at the position A, when the torque reduction amount is increased as presented in the chart (e) along with an increase in clockwise steering speed, a load applied to the front road wheels as steerable road wheels of the vehicle is increased. As a result, a frictional force between each of the front road wheels and a road surface is increased, and a cornering force of the front road wheels is increased, thereby providing an improved turn-in ability of the vehicle. That is, as presented in the chart (j), when the control of the engine 10 is performed in the intermediate zone between the position A and the position B so as to realize the final target torque reflecting the torque reduction amount (solid line), a larger clockwise (CW) yaw rate is generated in the vehicle, as compared to the case where the control corresponding to the torque reduction amount is not performed (dotted line).

In addition, as presented in the charts (d) and (e), when the steering speed gradually decreases toward the position B, the torque reduction amount is maintained at its maximum value, although the target additional deceleration synchronously decreases. Thus, it becomes possible to maintain the load applied to the front road wheels and keep up the turn-in ability of the vehicle, as long as the tuning of the steering wheel is continued.

Further, when the absolute value of the steering wheel angle is maintained constant during traveling from the position B to the position C, the torque reduction amount is smoothly reduced. Thus, in response to completion of the turning of the steering wheel, the load applied to the front road wheels can be gradually reduced to gradually reduce the cornering force of the front road wheels, thereby restoring the output torque of the engine 10, while stabilizing a vehicle body.

Figure 11:
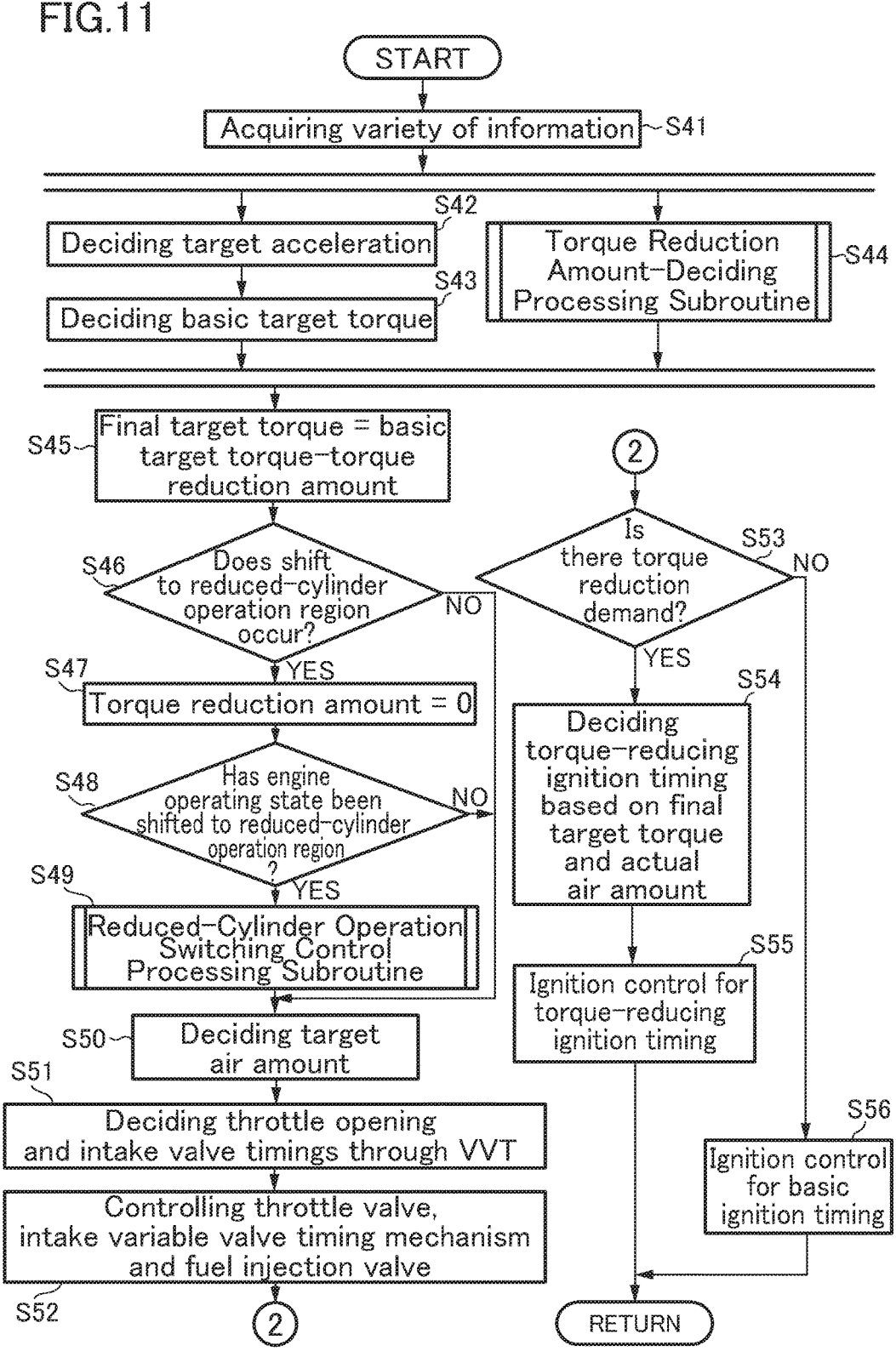
FIG. 11 is a flowchart of a second example of the engine control processing routine to be executed by the engine control device according to this embodiment, so as to control the engine.

Next, with reference to FIG. 11, a second example of the engine control processing routine to be executed by the engine control device according to this embodiment will be described. FIG. 11 is a flowchart of the second example of the engine control processing routine to be executed by the engine control device according to this embodiment, so as to control the engine.

Processings in steps S41 to S45 and S50 to S56 in the second example of the engine control processing routine depicted in FIG. 11 are the same as those in the steps S1 to S5 and S9 to S15 in the first example described with reference to FIG. 4, and therefore their description will be omitted.

The second example of the engine control processing routine depicted in FIG. 11 is configured to, when a change in the final target torque corresponding to a change in the torque reduction amount causes a shift of the operating state of the engine 10 from the all-cylinder operation region to the reduced-cylinder operation region, to prohibit the control of the engine according to a change in the final target torque corresponding to a change in the torque reduction amount.

Specifically, after the final target torque is decided in the step S45 by subtracting the torque reduction amount from the basic target torque, the engine output control part 57 operates to, based on the final target torque set in the step S45, determine whether or not the operating state of the engine 10 is shifted from the all-cylinder operation region to the reduced-cylinder operation region.

As a result, when the operating state of the engine 10 is shifted from the all-cylinder operation region to the reduced-cylinder operation region, i.e., when a change in the final target torque corresponding to a change in the torque reduction amount causes a shift of the operating state of the engine 10 from the all-cylinder operation region to the reduced-cylinder operation region, the routine proceeds to step S47. In the step S47, the final target torque-deciding part 55 operates to set, to 0, the torque reduction amount used in deciding the final target torque in the step S45. That is, the final target torque-deciding part 55 operates to set, as the final target torque, the basic target torque decided in the step S43, on the assumption that there is no demand for the torque reduction.

Subsequently, in step S48, the engine output control part 57 operates to, based on a corrected final target torque obtained using the torque reduction amount set to 0 in the step S47 (i.e., the basic target torque), determine whether or not the operating state of the engine 10 is shifted from the all-cylinder operation region to the reduced-cylinder operation region.

As a result, when the operating state of the engine 10 is shifted from the all-cylinder operation region to the reduced-cylinder operation region, i.e., when a change in the final target torque corresponding to a change in the basic target torque causes a shift of the operating state of the engine 10 from the all-cylinder operation region to the reduced-cylinder operation region, the routine proceeds to step S49. In step S49, the engine output control part 57 operates to perform the reduced-cylinder operation switching control processing subroutine for switching the operation mode of the engine 10 to the reduced-cylinder operation.

After completion of the reduced-cylinder operation switching control processing subroutine in the step S49, the routine proceeds to the step S50. In the step S50, the engine output control part 57 operates to decide a target air amount and a target fuel amount which are required for the engine 10 to output the corrected final target torque obtained using the torque reduction amount set to 0 in the step S47 (i.e., the basic target torque). That is, when the determination in the step S46 is made such that a change in the final target torque corresponding to a change in the torque reduction amount causes a shift of the operating state of the engine 10 from the all-cylinder operation region to the reduced-cylinder operation region, the engine output control part 57 operates to prohibit the control of the engine 10 according to a change in the final target torque corresponding to a change in the torque reduction amount, and control the engine 10 according to a change in the final target torque corresponding to a change in the basic target torque.

On the other hand, when the determination in the step S46 is made such that a change in the final target torque corresponding to a change in the torque reduction amount does not cause a shift of the operating state of the engine 10 from the all-cylinder operation region to the reduced-cylinder operation region, or when the determination in the step S48 is made such that a change in the final target torque corresponding to a change in the basic target torque does not cause a shift of the operating state of the engine 10 from the all-cylinder operation region to the reduced-cylinder operation region, the engine output control part 57 operates to decide the target air amount and the target fuel amount in the step S50, without performing the reduced-cylinder operation switching control processing subroutine in the step S49.

Further, when the determination in the step S46 is made such that a change in the final target torque corresponding to a change in the torque reduction amount causes a shift of the operating state of the engine 10 from the all-cylinder operation region to the reduced-cylinder operation region, and then, in the step S47, the torque reduction amount is set to 0, the engine output control part 57 operates to determine, in the step S53, that there is no demand for the torque reduction, and then, in the step S56, control the spark plug 14 so as to enable the spark plug 14 to perform ignition at the basic ignition timing. That is, when a change in the final target torque corresponding to a change in the torque reduction amount causes a shift of the operating state of the engine 10 from the all-cylinder operation region to the reduced-cylinder operation region, the engine output control part 57 operates to prohibit the control of the engine 10 according to a change in the final target torque corresponding to a change in the torque reduction amount. Thus, retardation of ignition timing by the preliminary control in the reduced-cylinder operation switching control processing subroutine is never performed simultaneously with retardation to the torque-retarding ignition timing.

Next, some modifications of the above embodiment will be described.

Although the above embodiment has been described based on an example in which the torque reduction amount-deciding part 53 is configured to obtain the target additional deceleration based on the steering speed, and decide the torque reduction amount based on the obtained target additional deceleration, the torque reduction amount-deciding part 53 may be configured to decide the torque reduction amount based on any driving state of the vehicle other than the accelerator pedal operation state (e.g., steering wheel angle, yaw rate, or slip ratio).

For example, the torque reduction amount-deciding part 53 may be configured to calculate a target yaw acceleration to be generated in the vehicle, based on a target yaw rate calculated from a steering wheel angle and a vehicle speed, and a yaw rate input from a yaw rate sensor, and obtain the target additional deceleration based on the calculated target yaw acceleration to decide the torque reduction amount. Alternatively, a lateral acceleration generated along with turning of the vehicle may be detected by an acceleration sensor, and the torque reduction amount may be decided based on the detected lateral acceleration. Alternatively, the torque reduction amount-deciding part 53 may be configured to determine the torque reduction amount, based on any demand different from the target additional deceleration (e.g., a torque required for cancelling out vibration of a powertrain during acceleration/deceleration).

In the second example of the engine control processing routine, when a change in the final target torque corresponding to a change in the torque reduction amount causes a shift of the operating state of the engine 10 from the all-cylinder operation region to the reduced-cylinder operation region, the control of the engine 10 according to a change in the final target torque corresponding to a change in the torque reduction amount is prohibited. Alternatively, the control of the engine 10 according to a change in the final target torque corresponding to a change in the torque reduction amount may be restricted, instead of being prohibited.

Specifically, when a change in the final target torque corresponding to a change in the torque reduction amount causes a shift of the operating state of the engine 10 from the all-cylinder operation region to the reduced-cylinder operation region, the final target torque may be determined by subtracting, from the basic target torque, a value derived from multiplying the torque reduction amount by a coefficient of less than 1. This makes it possible to prevent preventing a total of a retard amount of ignition timing for torque reduction amount from becoming excessive to thereby suppress the occurrence of misfire.

Next, advantageous effects of the engine control device according to the above embodiment and the modifications thereof will be described.

First of all, the engine output control part 57 is operable, when a change in the final target torque corresponding to a change in the torque reduction amount causes a shift of the operating state of the engine 10 from the all-cylinder operation region to the reduced-cylinder operation region, to prohibit the switching of the operation mode of the engine 10 from being performed simultaneously with the control of the engine according to a change in the final target torque corresponding to a change in the torque reduction amount, so that it is possible to prevent retardation of ignition timing by the preliminary control prior to switching of the operation mode from the all-cylinder operation to the reduced-cylinder operation from being performed simultaneously with retardation of ignition timing for torque reduction based on the driving state of the vehicle other than the accelerator pedal operation state. This makes it possible to control the engine 10 so as to accurately realize a vehicle behavior as intended by a driver, while satisfying both of the switching of the operation mode from the all-cylinder operation to the reduced-cylinder operation and the torque reduction based on the driving state of the vehicle other than the accelerator pedal operation state to thereby suppress the occurrence of misfire.

In particular, the torque reduction amount-deciding part 53 is operable to decide the torque reduction amount based on the steering wheel operation state of the vehicle. Thus, a temporal change in the torque reduction amount decided based on the steering operation state can be reflected on a temporal change in the final target torque, and thereby a deceleration according to a steering operation by a driver can be quickly added to the vehicle so as to apply load to front road wheels, so that it is possible to quickly increase a cornering force to thereby improve responsivity with respect to the steering wheel. This makes it possible to control the engine 10 so as to accurately realize a vehicle behavior as intended by the driver.

In addition, the engine output control part 57 is operable, when a change in the final target torque corresponding to a change in the torque reduction amount causes a shift of the operating state of the engine 10 from the all-cylinder operation region to the reduced-cylinder operation region, to maintain the operation mode of the engine 10 in the all-cylinder operation, so that it is possible to reliably prevent the switching of the operation mode of the engine 10 from being performed simultaneously with the control of the engine 10 according to a change in the final target torque corresponding to a change in the torque reduction amount, and prevent the retardation of ignition timing by the preliminary control prior to switching of the operation mode from the all-cylinder operation to the reduced-cylinder operation from being performed simultaneously with the retardation of ignition timing for torque reduction based on the driving state of the vehicle other than the accelerator pedal operation state. This makes it possible to control the engine 10 so as to accurately realize a vehicle behavior as intended by a driver, while satisfying both of the switching of the operation mode from the all-cylinder operation to the reduced-cylinder operation and the torque reduction based on the driving state of the vehicle other than the accelerator pedal operation state to thereby suppress the occurrence of misfire.

Further, the engine output control part 57 is operable, when a change in the final target torque corresponding to a change in the torque reduction amount causes a shift of the operating state of the engine 10 from the all-cylinder operation region to the reduced-cylinder operation region, to restrict the control of the engine 10 according to a change in the final target torque corresponding to a change in the torque reduction amount, so that it is possible to prevent a total of a retard amount of ignition timing for torque reduction based on the driving state of the vehicle other than the accelerator pedal operation state and a retard amount of ignition timing by the preliminary control prior to switching of the operation mode from the all-cylinder operation to the reduced-cylinder operation from becoming excessive. This makes it possible to control the engine 10 so as to accurately realize a vehicle behavior as intended by a driver, while satisfying both of the switching of the operation mode from the all-cylinder operation to the reduced-cylinder operation and the torque reduction based on the driving state of the vehicle other than the accelerator pedal operation state to thereby suppress the occurrence of misfire.

In particular, the engine output control part 57 is operable, when a change in the final target torque corresponding to a change in the torque reduction amount causes a shift of the operating state of the engine 10 from the all-cylinder operation region to the reduced-cylinder operation region, to prohibit the control of the engine 10 according to a change in the final target torque corresponding to a change in the torque reduction amount, so that it is possible to prevent the retardation of ignition timing by the preliminary control prior to switching of the operation mode from the all-cylinder operation to the reduced-cylinder operation from being performed simultaneously with the retardation of ignition timing for torque reduction based on the driving state of the vehicle other than the accelerator pedal operation state. This makes it possible to control the engine 10 so as to accurately realize a vehicle behavior as intended by a driver, while satisfying both of the switching of the operation mode from the all-cylinder operation to the reduced-cylinder operation and the torque reduction based on the driving state of the vehicle other than the accelerator pedal operation state to thereby suppress the occurrence of misfire.

Further, the engine output control part 57 is operable, when the operating state of the engine 10 is shifted from the all-cylinder operation region to the reduced-cylinder operation region, to perform the preliminary control of actuating the throttle valve 5 so as to increase the intake air amount to be delivered to each of the cylinders 2, and actuating the spark plug 14 so as to retard the ignition timing of the spark plug 14, and, during the preliminary control, to restrict the control of the engine 10 according to a change in the final target torque corresponding to a change in the torque reduction amount, so that it is possible to reliably prevent the retardation of ignition timing by the preliminary control prior to switching of the operation mode from the all-cylinder operation to the reduced-cylinder operation from being performed simultaneously with the retardation of ignition timing for torque reduction based on the driving state of the vehicle other than the accelerator pedal operation state.

What is claimed is:

1. An engine control device for controlling an internal combustion engine having a plurality of cylinders and comprising an air amount adjustment device for adjusting an amount of intake air to be delivered to each of the cylinders, according to a target torque, and an ignition timing adjustment device for adjusting an ignition timing of an ignition device provided in each of the cylinders, based on a driving state of a vehicle equipped with the engine, the engine being capable of switching an operation mode thereof between an all-cylinder operation in which combustion of an air-fuel mixture is performed in all of the plurality of cylinders and a reduced-cylinder operation in which combustion of an air-fuel mixture is stopped in a part of the plurality of cylinders, the engine control device comprising:
   a basic target torque-deciding part for deciding a basic target torque, based on a driving state of the vehicle including an accelerator pedal operation state;

a torque reduction amount-deciding part for deciding a torque reduction amount, based on a driving state of the vehicle other than the accelerator pedal operation state;

a final target torque-deciding part for deciding a final target torque, based on the decided basic target torque and the decided torque reduction amount; and an engine output control part for switchably setting the operation mode of the engine to the reduced-cylinder operation when an operating state of the engine falls within a predefined reduced-cylinder operation region or to the all-cylinder operation when the operating state of the engine falls within a predefined all-cylinder operation region, and controlling the engine to cause the engine to output the decided final target torque in the set operation mode, wherein the engine output control part is operable, when a change in the final target torque corresponding to a change in the torque reduction amount causes a shift of the operating state of the engine from the all-cylinder operation region to the reduced-cylinder operation region, to prohibit switching of the operation mode of the engine from being performed simultaneously with control of the engine according to a change in the final target torque corresponding to a change in the torque reduction amount.

2. The engine control device as recited in claim 1, wherein the torque reduction amount-deciding part is operable to decide the torque reduction amount based on a steering wheel operation state of the vehicle.

3. The engine control device as recited in claim 1, wherein the engine output control part is operable, when a change in the final target torque corresponding to a change in the torque reduction amount causes a shift of the operating state of the engine from the all-cylinder operation region to the reduced-cylinder operation region, to maintain the operation mode of the engine in the all-cylinder operation.

4. The engine control device as recited in claim 1, wherein the engine output control part is operable, when a change in the final target torque corresponding to a change in the torque reduction amount causes a shift of the operating state of the engine from the all-cylinder operation region to the reduced-cylinder operation region, to restrict the control of the engine according to a change in the final target torque corresponding to a change in the torque reduction amount.

5. The engine control device as recited in claim 4, wherein the engine output control part is operable, when a change in the final target torque corresponding to a change in the torque reduction amount causes a shift of the operating state of the engine from the all-cylinder operation region to the reduced-cylinder operation region, to prohibit the control of the engine according to a change in the final target torque corresponding to a change in the torque reduction amount.

6. The engine control device as recited in claim 1, wherein the engine output control part is operable, when the operating state of the engine is shifted from the all-cylinder operation region to the reduced-cylinder operation region, to perform a preliminary control of actuating the air amount adjustment device so as to increase an intake air amount to be delivered to each of the cylinders, and actuating the ignition timing adjustment device so as to retard the ignition timing of the ignition device, and, during the preliminary control, to restrict the control of the engine according to a change in the final target torque corresponding to a change in the torque reduction amount.

7. The engine control device as recited in claim 2, wherein the torque reduction amount-deciding part is operable to decide a target additional deceleration to be added to the vehicle according to a steering speed calculated from a steering wheel angle of the steering wheel, and decide a value of the torque reduction amount for realizing the target additional deceleration, the torque reduction amount-deciding part being operable to decide the target additional deceleration such that as the steering speed becomes larger, the target additional deceleration becomes larger, and a rate of increase of the target additional deceleration becomes smaller.

8. An engine control device for controlling an internal combustion engine having a plurality of cylinders and comprising a throttle valve and ignition devices provided in each of the cylinders, based on a driving state of a vehicle equipped with the engine, the engine being capable of switching an operation mode thereof between an all-cylinder operation in which combustion of an air-fuel mixture is performed in all of the plurality of cylinders and a reduced-cylinder operation in which combustion of an air-fuel mixture is stopped in a part of the plurality of cylinders, the engine control device comprising:

an accelerator position sensor for detecting a position of an accelerator pedal of the vehicle;

a steering wheel angle sensor for detecting a turning angle of a steering wheel of the vehicle;

a basic target torque-deciding part for deciding a basic target torque, based on an output value of the accelerator position sensor;

a torque reduction amount-deciding part for deciding a torque reduction amount, based on an output value of the steering wheel angle sensor;

a final target torque-deciding part for deciding a final target torque, based on the decided basic target torque and the decided torque reduction amount; and an engine output control part for switchably setting the operation mode of the engine to the reduced-cylinder operation when an operating state of the engine falls within a predefined reduced-cylinder operation region or to the all-cylinder operation when the operating state of the engine falls within a predefined all-cylinder operation region, and controlling the throttle valve and ignition timings of the ignition devices to cause the engine to output the decided final target torque in the set operation mode, wherein the engine output control part is operable, when a change in the final target torque corresponding to a change in the torque reduction amount causes a shift of the operating state of the engine from the all-cylinder operation region to the reduced-cylinder operation region, to prohibit switching of the operation mode of the engine from being performed simultaneously with control of the ignition timings according to a change in the final target torque corresponding to a change in the torque reduction amount.

9. An engine control device for controlling an internal combustion engine based on a driving state of a vehicle equipped with the engine, the engine having a plurality of cylinders and comprising an air amount adjustment device for adjusting an amount of intake air to be delivered to each of the cylinders, according to a target torque, an ignition timing adjustment device for adjusting an ignition timing of an ignition device provided in each of the cylinders, and a valve stopping mechanism comprising a lost motion mechanism interposed between a cam and a valve provided in each of the cylinders and operable to selectively enable and disable a driving force of the cam to be transmitted to the valve, the engine being capable of switching an operation mode thereof between an all-cylinder operation in which combustion of an air-fuel mixture is performed in all of the plurality of cylinders and a reduced-cylinder operation in which combustion of an air-fuel mixture is stopped in a part of the plurality of cylinders by use of the valve stopping mechanism, the engine control device comprising:

- a basic target torque-deciding part for deciding a basic target torque, based on a driving state of the vehicle including an accelerator pedal operation state;
- a torque reduction amount-deciding part for deciding a torque reduction amount, based on a driving state of the vehicle other than the accelerator pedal operation state;
- a final target torque-deciding part for deciding a final target torque, based on the decided basic target torque and the decided torque reduction amount; and
- an engine output control part for switchably setting the operation mode of the engine to the reduced-cylinder operation when an operating state of the engine falls within a predefined reduced-cylinder operation region or to the all-cylinder operation when the operating state of the engine falls within a predefined all-cylinder operation region, and controlling the engine to cause the engine to output the decided final target torque in the set operation mode, wherein the engine output control part is operable, when a change in the final target torque corresponding to a change in the torque reduction amount causes a shift of the operating state of the engine from the all-cylinder operation region to the reduced-cylinder operation region, to prohibit switching of the operation mode of the engine from being performed simultaneously with control of the engine according to a change in the final target torque corresponding to a change in the torque reduction amount.

* * * * *